US011993520B2

(12) United States Patent
Osten et al.

(10) Patent No.: US 11,993,520 B2
(45) Date of Patent: May 28, 2024

(54) METHOD FOR PREPARING A HIGH-PURITY HYDRATED NICKEL SULPHATE

(71) Applicant: IGO LIMITED, South Perth (AU)

(72) Inventors: Karel John Osten, North Perth (AU); Rossano Antonio Grassi, Bedford (AU); Arturo Gutierrez Clausdorff, Leederville (AU); Ryan Colin Harrison, Hillarys (AU)

(73) Assignee: IGO Limited, Western Australia (AU)

( * ) Notice: Subject to any disclaimer, the term of this patent is extended or adjusted under 35 U.S.C. 154(b) by 568 days.

(21) Appl. No.: 17/280,962

(22) PCT Filed: Sep. 26, 2019

(86) PCT No.: PCT/AU2019/051044
§ 371 (c)(1),
(2) Date: Mar. 29, 2021

(87) PCT Pub. No.: WO2020/061639
PCT Pub. Date: Apr. 2, 2020

(65) Prior Publication Data
US 2021/0354997 A1 Nov. 18, 2021

(30) Foreign Application Priority Data

Sep. 27, 2018 (AU) .................................. 2018903643
May 23, 2019 (AU) .................................. 2019901760

(51) Int. Cl.
*C01G 53/10* (2006.01)
*C22B 3/00* (2006.01)
(Continued)

(52) U.S. Cl.
CPC ............... *C01G 53/10* (2013.01); *C22B 3/26* (2021.05); *C22B 3/42* (2013.01); *C22B 23/0461* (2013.01); *C22B 23/0476* (2013.01)

(58) Field of Classification Search
CPC .......... C01G 53/10; C01G 51/00; C22B 3/26; C22B 3/42; C22B 23/0461; C22B 23/0476
See application file for complete search history.

(56) References Cited

U.S. PATENT DOCUMENTS 3,276,863 A    10/1966   Drobnick et al.
5,855,858 A     1/1999   Jones
(Continued)

FOREIGN PATENT DOCUMENTS

AU       3 089 584 A   *   1/1985   ............ C01G 53/10
BR   PI 0 507 138 A   *   6/2007   ............ C22B 3/409
(Continued)

OTHER PUBLICATIONS

Bacon G. et al. "Solvent extraction as an enabling technology in the nickel industry," Journal of the Southern African Institute of Mining and Metallury, vol. 102, No. 8, Nov. 1, 2002, pp. 435-444; XP055918610.
(Continued)

*Primary Examiner* — Anthony J Zimmer
(74) *Attorney, Agent, or Firm* — Renner, Kenner, Greive, Bobak, Taylor & Weber Co., LPA

(57) ABSTRACT

A method for recovering $NiSO_4 \cdot 6H_2O$ crystals from a nickel rich organic phase is provided. The method includes contacting a nickel rich organic phase with an aqueous strip solution of sufficient $H_2SO_4$ concentration to extract nickel from the organic phase and of sufficient $Ni^{2+}$ concentration to precipitate $NiSO_4 \cdot 6H_2O$ crystals and form a nickel lean organic phase. Also provided are methods for recovering
(Continued)

$NiSO_4 \cdot 6H_2O$ crystals that include preceding processing steps, including low temperature pressure oxidation (LT-POX) autoclaving of a nickel sulphide concentrate to afford a pregnant leach solution (PLS).

15 Claims, 10 Drawing Sheets

(51) Int. Cl.
   *C22B 3/24* (2006.01)
   *C22B 3/26* (2006.01)
   *C22B 3/42* (2006.01)

(56) References Cited

U.S. PATENT DOCUMENTS 6,267,800 B1 * 7/2001 Freeman ............. C22B 23/0461
   423/150.5

2015/0123030 A1 * 5/2015 Conner .................. C22B 3/08
   422/119
2015/0123469 A1 * 5/2015 Lange ................... H01F 27/34
   307/10.1
2019/0330712 A1 * 10/2019 Wang ................ C22B 23/0484

FOREIGN PATENT DOCUMENTS

| | | | |
|---|---|---|---|
| CN | 108 570 555 | * | 9/2018 |
| GB | 1571272 A | | 7/1980 |
| WO | 2005073416 A1 | | 8/2005 |
| WO | 2006029439 A1 | | 3/2006 |
| WO | 2007039663 A1 | | 4/2007 |
| WO | 2013120131 A1 | | 8/2013 |
| WO | 2018076993 A1 | | 5/2018 |

OTHER PUBLICATIONS

Supplementary European Search Report for counterpart EP Application No. EP 19 86 6230 dated May 6, 2022.

* cited by examiner

METHOD FOR PREPARING A HIGH-PURITY HYDRATED NICKEL SULPHATE

FIELD OF THE INVENTION

The invention relates to a method for preparing a high-purity hydrated nickel sulphate, and a high-purity hydrated nickel sulphate produced by this method.

BACKGROUND OF THE INVENTION

High-purity nickel salts, such as in the form of high-purity acidic nickel sulphate solutions and/or in the form of solid high-purity hydrated nickel sulphate, are important sources of nickel metal as a component involved in the manufacture of high-value products. In particular, nickel sulphate is a significant industrial commodity with a wide range of applications. For example, aqueous acidic solutions of nickel sulphate are the dominant precursor of electrowon metallic nickel, and solid nickel sulphate hexahydrate is an important source of nickel for use in advanced lithium-ion batteries.

These downstream applications require high purity nickel salts. Thus, the nickel salts need to be of sufficient purity to meet the required chemical and/or physical specifications for use in those applications. For example, electrowinning of metallic nickel from an acidic nickel sulphate solution in the presence of certain soluble impurities results in excessive energy consumption, physical deformation and unacceptable chemical specifications. Critical impurities include but are not limited to calcium, sodium, magnesium, iron, copper, cobalt, manganese and zinc.

Nickel resources are divided into two major categories—sulphide ore and oxidised ore (laterite or lateritic ore). As described in WO2007/039663, the conventional exploitation of nickel sulphide ore is essentially a pyrometallurgical process, where the mined ore is finely ground, and the nickel sulphide minerals concentrated by froth flotation to produce a nickel concentrate. The concentrate is then treated further by smelting and reduction to produce an intermediate, nickel bearing matte, which contains also copper, cobalt, and iron. A drawback of the smelting process however is the generation of sulphur dioxide, which has to be treated in an acid plant to produce sulphuric acid, a product that is not always easy to dispose of from the smelter location. Losses of nickel and cobalt into smelter slag are significant, and there can be problems in dealing with some of the minor elements in concentrates, such as magnesium and arsenic.

The intermediate matte requires further refining by hydrometallurgical processes. But these processes, including oxidative leaching or pressure leaching, followed by impurity removal and hydrogen reduction or electrowinning suffer from the same issues of sulphuric acid by products as well as other waste products (eg ammonium sulphate).

For some applications, the purified nickel sulphate solution can be used directly as a feed solution for the recovery of the final high-purity product. A typical but not limiting example is the feed solution (advance electrolyte) for a nickel electrowinning circuit. For other applications, a solid high-purity nickel salt is the preferred source material. Recovery of such solid high-purity nickel salts is typically energy intensive and may involve, for example, high temperature crystallisation. Alternatively, recovery of such solid high-purity nickel salts through evaporative crystallisation at ambient or near ambient conditions is typically an unfavourably lengthy process.

The principal commercial sources of aqueous acidic solutions of nickel sulphate result from the pressure oxidation of non-ferrous metal (copper/nickel/cobalt) sulphide concentrates, the so-called POX process, or from the high temperature sulphuric acid leaching of nickel laterites, the so-called HPAL process. The hydrometallurgical steps used to generate the nickel sulphate include but are not limited to the roast/leach, atmospheric and high pressure leaching, heap leaching, and biohydrometallurgical technologies. Other possible sources of aqueous acidic solutions of nickel sulphate are the bacterial leaching of non-ferrous metal run-of-mine ores and concentrates using both agitated tank and heap leaching modes of operation, and as a by-product of a number of copper electrowinning operations.

These processes are generally non-selective in that there is simultaneous dissolution of a range of other metallic components of the source material, particularly iron, manganese, copper, cobalt and zinc. The relative concentrations of the impurity metals compared to the target nickel concentration is a direct consequence of the initial source of nickel and the metallurgical methods involved in the generation of the initial pregnant leach solution containing soluble nickel sulphate.

Whatever the source of the aqueous acidic nickel sulphate solution (pregnant leach solution), the removal of the deleterious soluble impurities is achieved via a series of bulk and/or selective steps using but not limited to solvent extraction and/or ion exchange and/or precipitation procedures. This series of purification steps is required because there is no commercially or technically viable method for recovering a high-purity nickel product from such impure aqueous acidic solutions.

Typically such steps involve the application of one or more of such methods as solvent extraction and/or ion exchange and/or cementation and/or selective/non-selective precipitation. All of these concentration/purification steps tend to be energy intensive and typically involve the use of one or more chemical reagents (consumables).

The actual selection and sequence of impurity removal steps depends on many factors, but particularly on the relative concentrations of the nickel and impurity components. The steps need to be complimentary with one another and address process water balance considerations while minimising reagent types and consumption. In particular, the use of non-conventional reagents should be avoided while conditions of the method should limit the degradation of reagents of the method.

Various methods have been proposed for crystallising and/or precipitating nickel sulphate hexahydrate from a purified aqueous acidic nickel sulphate solution. The most common is via conventional thermal and vacuum techniques. However, such methods are highly energy intensive processes and suffer from a number of operational and maintenance problems such as particle size distribution, scale formation, excessive corrosion, etc.

An alternative approach, which to the inventors' knowledge has not yet been commercially applied, involves a solvent displacement process in which, for example isopropanol is added to reduce the solubility limit of nickel sulphate and enhances the crystallisation of nickel sulphate hexahydrate. A problem with this approach is that, apart from the need to use an extraneous reagent to the overall system, it is necessary to recover and recycle as much of the isopropanol as possible. This involves a distillation step which is energy intensive.

An object of the invention is to address one or more shortcomings of the prior methods for recovering nickel sulphate as nickel sulphate hexahydrate.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

The current invention seeks to provide a method of recovering nickel sulphate hexahydrate ($NiSO_4.6H_2O$). The nickel sulphate hexahydrate should be high purity. By 'high purity' it is meant a nickel content of at least 21%, and preferably between 21 and 24% and most preferably around 22-23%, in the nickel sulphate hexahydrate. As would be understood by the skilled person this includes a nickel content of 22.0%, 22.1%, 22.2%, 22.3%, 22.4%, 22.5%, 22.6%, 22.7%, 22.8%, 22.9% and 23%, in the nickel sulphate hexahydrate. It is also meant that high purity/battery-grade nickel sulphate hexahydrate is also very low in trace metal element levels, including no more than 350 ppm Co, no more than 10 ppm Cu, no more than 25 ppm Ca, no more than 15 ppm Cr, no more than 15 ppm Fe, no more than 35 ppm Mg, no more than 15 ppm Mn, no more than 15 ppm Pb and no more than 15 ppm Zn. Preferably, high purity/battery-grade nickel sulphate hexahydrate includes no more than 250 ppm Co, no more than 5 ppm Cu, no more than 15 ppm Ca, no more than 10 ppm Cr, no more than 10 ppm Fe, no more than 25 ppm Mg, no more than 10 ppm Mn, no more than 10 ppm Pb and no more than 10 ppm Zn.

High purity nickel sulphate hexahydrate is an important source of nickel for use in advanced lithium-ion batteries. It is therefore also referred to herein as 'battery-grade' nickel sulphate, wherein battery-grade nickel sulphate has the same nickel sulphate hexahydrate content as detailed above for high purity nickel sulphate hexahydrate, and is used interchangeably.

In a first aspect of the invention, there is provided a method of recovering $NiSO_4.6H_2O$ crystals from a nickel rich organic phase, the method including:

contacting a nickel rich organic phase with an aqueous strip solution of sufficient $H_2SO_4$ concentration to extract nickel from the organic phase and of sufficient $Ni^{2+}$ concentration to precipitate $NiSO_4.6H_2O$ crystals and form a nickel lean organic phase.

The skilled person will appreciate that the concentration of $H_2SO_4$ and $Ni^{2+}$ in the strip solution will vary depending on the particular conditions under which the method is carried out (e.g. temperature, pressure, presence of other ions).

In an embodiment, the strip solution has a $Ni^{2+}$ concentration of 60 g/L or greater. More preferably, the strip solution has a $Ni^{2+}$ concentration of 70 g/L or greater. Most preferably, the strip solution has a $Ni^{2+}$ concentration of 80 g/L or greater. Additionally, or alternatively, the strip solution has a $Ni^{2+}$ concentration of up to 100 g/L.

In an embodiment, the strip solution has an $H_2SO_4$ concentration of 300 g/L or greater, or 350 g/L or greater, or the strip solution has a $H_2SO_4$ concentration of from about 350 up to about 450 g/L.

In an alternative embodiment, the strip solution has an $H_2SO_4$ concentration of 300 g/L or less. Preferably, the strip solution has a $H_2SO_4$ concentration of 10-300 g/L.

In an embodiment, the strip solution has a $SO_4^{2-}$ and $Ni^{2+}$ concentration that are together at or near the solubility limit of $NiSO_4.6H_2O$. By near the solubility limit it is meant that the concentration is such that at least 90 wt % of the nickel extracted from the organic phase is precipitated as $NiSO_4.6H_2O$. Preferably, 95 wt % of the nickel extracted from the organic phase is precipitated as $NiSO_4.6H_2O$. More preferably, 98 wt % of the nickel extracted from the organic phase is precipitated as $NiSO_4.6H_2O$. Most preferably, 99 wt % of the nickel extracted from the organic phase is precipitated as $NiSO_4.6H_2O$.

In an embodiment, the nickel rich organic phase is immiscible with water.

In an embodiment, the method further includes separating the $NiSO_4.6H_2O$ crystals from the nickel lean organic phase.

In an embodiment, the nickel rich organic phase includes at least: nickel (such as in the form of $Ni^{2+}$), an organic extractant, and an organic diluent. Preferably, the nickel rich organic phase includes a coordination complex of nickel and an organic extractant, wherein the organic extractant dissociates from the nickel in the presence of a sufficient concentration of $H^+$ ions (such as those derived from the dissociation of $H_2SO_4$). More preferably, the $H^+$ ions are provided in an ion exchange process with the $NiSO_4$.

In forms of the above embodiment, the organic extractant is selected from the group consisting of: organophosphorus acids, chelating oximes or hydroxyoximes, carboxylic acids, and high molecular weight amines (such as n-octylaniline, tri-octyl/decyl amine, tri-octylamine, tri-iso-octyamine, N-n-octylaniline, and 2-ethylhexyl amino methyl pyridine).

In forms of the above embodiment, the organic extractant is from about 10 wt % up to about 25 wt % of the organic phase. Preferably, the organic extractant is from about 12 wt % of the organic phase. More preferably, the organic extractant is from about 14 wt % of the organic phase. Alternatively, or additionally, the organic extractant is up to about 22 wt % of the organic phase. More preferably, the organic extractant is up to about 20 wt % of the organic phase. In one example, the organic extractant is about 18 wt % of the organic phase.

In forms of the above embodiment, the organic extractant is one or more branched carboxylic acids, such as a branched carboxylic acid having from 7 carbon atoms up to 15 carbon atoms. Preferably, the branched carboxylic acid has from 8 carbon atoms. Most preferably, the branched carboxylic acid has from 9 carbon atoms. Alternatively or additionally, the branched carboxylic acid has up to 14 carbon atoms. Preferably, the branched carboxylic acid has up to 13 carbon atoms. More preferably, the branched carboxylic acid has up to 12 carbon atoms. Most preferably, the branched carboxylic acid has up to 11 carbon atoms. In one form, the branched carboxylic acid has 10 carbon atoms.

In forms of the above embodiment, the organic extractant is a branched monocarboxylic acid.

In forms of the above embodiment, the organic extractant is a branched carboxylic acid of the structure:

wherein $R_1$ and $R_2$ are branched or straight chain unsubstituted alkyl groups, and $R_1$ and $R_2$ together consist of from 5 to 13 carbon atoms.

Preferably, the branched carboxylic acid is a neodecanoic acid. Neodecanoic acid is a mixture of carboxylic acids with the common structural formula $C_{10}H_{20}O_2$. The term neodecanoic acid therefore encompasses compounds such as: 2,2,3,5-Tetramethylhexanoic acid, 2,4-Dimethyl-2-isopropylpentanoic acid, 2,5-Dimethyl-2-ethylhexanoic acid, 2,2-Dimethyloctanoic acid, and/or 2,2-Diethylhexanoic acid. In preferred forms of the invention, the neodecanoic acid includes one or more compounds selected from the group consisting of those listed above.

In forms of the above embodiment, the organic diluent is immiscible with water.

In forms of the above embodiment, the organic diluent is one or more $C_{10+}$ alkanes. Preferably, the organic diluent is one or more $C_{11+}$ alkanes. Most preferably, the organic diluent is one or more $C_{12+}$ alkanes.

In forms of the above embodiment, the organic diluent includes one or more isoalkanes, one or more cycloalkanes, and mixtures thereof.

In an embodiment, the organic diluent includes, consists of, or consists essentially of one or more isoalkanes, one or more cycloalkanes, and mixtures thereof. In one example, the organic diluent includes, consists of, or consists essentially of one or more $C_{10+}$ isoalkanes and/or one or more $C_{10+}$ cycloalkanes. In preferred forms, the organic diluent includes, consists of, or consists essentially of one or more $C_{11+}$ isoalkanes and/or one or more $C_{11+}$ cycloalkanes. More preferably, the organic diluent includes, consists of, or consists essentially of one or more $C_{12+}$ isoalkanes and/or one or more $C_{12+}$ cycloalkanes.

In an embodiment the method includes nickel solvent extraction, wherein the nickel solvent extraction step includes:

contacting an aqueous acidic nickel sulphate containing solution with an organic phase including an organic extractant to selectively extract nickel sulphate from the aqueous solution into the organic phase to form a nickel sulphate lean aqueous raffinate and the nickel rich organic phase; and separating the raffinate and the nickel rich organic phase;

wherein the organic extractant is one or more branched carboxylic acids.

In an alternative embodiment, the method includes nickel solvent extraction, wherein the nickel solvent extraction includes:

a solvent extraction step including contacting an aqueous solution including nickel sulphate and one or more metal impurities with an organic phase, the organic phase including one or more branched carboxylic acid extractants to selectively facilitate the extraction of nickel sulphate from aqueous solution into the organic phase and form the nickel rich organic phase.

In an alternative embodiment, the method includes nickel solvent extraction, wherein the nickel solvent extraction step includes;

contacting an aqueous nickel sulphate containing solution with an organic phase including an organic extractant to form the nickel rich organic phase, wherein the aqueous nickel sulphate containing solution is a pregnant leach solution (PLS). This embodiment of the invention is described in the context of the PLS being a cobalt-lean nickel-rich raffinate.

In forms of the above mentioned embodiments, the nickel sulphate containing solution is a pregnant leach solution derived from the high temperature pressure oxidation (HTPOX) of a nickel sulphide concentrate. As would be understood by the skilled person, 'high temperature' in this context is generally around and above 200° C. In alternative forms of the above mentioned embodiments that will be detailed below, the nickel sulphate containing solution is a pregnant leach solution derived from low temperature pressure oxidation (LTPOX) of a nickel sulphide concentrate. As would be understood by the skilled person, 'low temperature' in this context is generally around and below 100-120° C.

In forms of the above mentioned embodiments and alternative embodiments, the nickel sulphate containing solution has been subjected to cobalt extraction prior to nickel solvent extraction, wherein the cobalt extraction step includes an organic extractant that selectively extracts cobalt over nickel into an organic phase to form a cobalt-rich nickel-lean extractant stream and a cobalt-lean nickel-rich raffinate. Preferably, the organic phase of the cobalt-rich nickel-lean extractant stream is converted to a cobalt-lean organic phase and the cobalt-lean organic phase is recycled as the organic phase or a component thereof.

In forms of the above mentioned embodiments and alternative embodiments, the nickel sulphate containing solution has been clarified prior to nickel solvent extraction. Preferably, the nickel sulphate containing solution has been clarified prior to being subjected to the cobalt extraction step.

In forms of the above mentioned embodiments and alternative embodiments, the nickel sulphate containing solution has been subjected to a secondary neutralisation step prior to nickel solvent extraction, wherein the secondary neutralisation step has been performed using one or more bases selected from the group including ammonium hydroxide, limestone, lime, calcrete, magnesia, magnesite and sodium hydroxide. Preferably, the nickel sulphate containing solution has been subjected to the secondary neutralisation step prior to being subjected to the cobalt extraction step. More preferably, the nickel sulphate containing solution has been subjected to the secondary neutralisation step prior to being clarified.

In forms of the above mentioned embodiments and alternative embodiments, the nickel sulphate containing solution has been subjected to a counter current decantation step prior to nickel solvent extraction. Preferably, the nickel sulphate containing solution has been subjected to the counter current decantation step prior to being subjected to the cobalt extraction step. More preferably, the nickel sulphate containing solution has been subjected to the counter current decantation step prior to being clarified. Even more preferably, the nickel sulphate containing solution has been subjected to the counter current decantation step prior to being subjected to the secondary neutralisation step.

In forms of the above mentioned embodiments and alternative embodiments, the nickel sulphate containing solution has been subjected a primary neutralisation step prior to nickel solvent extraction, wherein the primary neutralisation has been performed using one or more bases selected from the group including ammonium hydroxide, limestone, lime, calcrete, magnesia, magnesite and sodium hydroxide. Preferably, the nickel sulphate containing solution has been subjected to the primary neutralisation step prior to being subjected to the cobalt extraction step. More preferably, the nickel sulphate containing solution has been subjected to the primary neutralisation step prior to being clarified. Even more preferably, the nickel sulphate containing solution has been subjected to the primary neutralisation step prior to being subjected to the secondary neutralisation step. Yet more preferably, the nickel sulphate containing solution has been subjected to the primary neutralisation step prior to being subjected the counter current decantation step.

In forms of the above mentioned embodiments and alternative embodiments, the nickel sulphate containing solution is a PLS generated by a low temperature pressure oxidation (LTPOX) autoclave step on a nickel sulphide concentrate.

In forms of the above mentioned embodiments and alternative embodiments, the LTPOX autoclave step uses oxygen to oxidise the nickel sulphide of the nickel sulphide concentrate to nickel sulphate.

In forms of the above mentioned embodiments and alternative embodiments, the nickel sulphide concentrate contains more than 10% nickel.

In forms of the above mentioned embodiments and alternative embodiments, the nickel sulphide concentrate has been subjected to a fine grinding step, wherein the particles of the nickel sulphide concentrate are ground to a $P_{80}$ of 10 microns.

In forms of the above mentioned embodiments and alternative embodiments, the nickel sulphide concentrate has been subjected to a repulping step prior to being subjected to the LTPOX autoclave step. Preferably, the nickel sulphide concentrate has been subjected to the repulping step prior being subjected to the fine grinding step.

In forms of the above embodiment and alternative embodiments, the nickel-rich organic phase is converted to a nickel-lean organic phase and the nickel-lean organic phase is recycled as the organic phase or a component thereof.

In forms of the above embodiments and alternative embodiments, the one or more bases are selected from the group including ammonium hydroxide, magnesia and sodium hydroxide are used in the nickel solvent extraction step; preferably ammonium hydroxide.

In forms of the above mentioned embodiments and alternative embodiments, the nickel lean organic phase is recycled as the organic phase or a component thereof.

In forms of the above mentioned embodiments and alternative embodiments, the organic phase includes, consists of, or consists essentially of an organic diluent and the organic extractant.

In an embodiment, the nickel rich organic phase includes: 5 ppm or less Fe and/or 5 ppm or less Mn and/or 5 ppm or less Cu and/or 60 ppm or less Co and/or 10 ppm or less Zn.

In an embodiment, the $NiSO_4.6H_2O$ crystals include: 5 ppm or less Fe and/or 5 ppm or less Mn and/or 5 ppm or less Cu and/or 60 ppm or less Co and/or 10 ppm or less Zn.

In an embodiment, the one or more metal impurities are selected from the group consisting of: Fe, Mn, Cu, Co, Zn, and combinations thereof.

In an embodiment, the nickel lean organic phase contains substantially no nickel sulphate. By substantially no nickel sulphate, it is meant less than 10 ppm.

In an embodiment, the aqueous acidic nickel sulphate containing solution is a pregnant leach solution derived from the high temperature pressure oxidation of a nickel sulphide concentrate.

In an embodiment, the aqueous acidic nickel sulphate containing solution is a pregnant leach solution derived from the low temperature pressure oxidation of a nickel sulphide concentrate.

In an embodiment, the method may be carried out over a range of temperatures, for example a temperature of from about 10° C. to about 50° C. Preferably, the method may be carried out at a temperature of from about 10° C. to about 40° C. However, advantageously, the method can be carried out at ambient temperature.

In a second aspect of the invention, there is provided $NiSO_4.6H_2O$ crystals produced according to the method of the first aspect of the invention.

Also disclosed herein is a method for recovering nickel sulphate from an aqueous acidic nickel sulphate containing solution including one or more impurities, the method including:

contacting the aqueous acidic nickel sulphate containing solution with an organic phase including an organic extractant to selectively extract nickel sulphate from the aqueous solution into the organic phase to form a nickel sulphate lean aqueous raffinate and a nickel sulphate rich organic phase; and separating the raffinate and the nickel sulphate rich organic phase;

wherein the organic extractant is one or more branched carboxylic acids.

Further disclosed herein is a process for producing a purified nickel sulphate, the process including:

a solvent extraction step including contacting an aqueous solution including nickel sulphate and one or more metal impurities with an organic phase, the organic phase including one or more branched carboxylic acid extractants to selectively facilitate the extraction of nickel sulphate from aqueous solution into the organic phase and form a nickel sulphate rich organic phase.

In a third aspect of the invention, there is provided a method for recovering nickel sulphate, the method including:

a low temperature pressure oxidation (LTPOX) autoclave step on a nickel sulphide concentrate, wherein the nickel sulphide concentrate contains more than 10% nickel.

In one embodiment of this aspect of the invention, the particles of the nickel sulphide concentrate are fine ground to a $P_{80}$ of 10 microns.

In another embodiment, the LTPOX autoclave step uses oxygen to oxidise the nickel sulphide of the nickel sulphide concentrate to nickel sulphate.

In another embodiment, the method for recovering nickel sulphate further includes a primary neutralisation step using one or more bases selected from the group including ammonium hydroxide, limestone, lime, calcrete, magnesia, magnesite and sodium hydroxide. Preferably, the method further includes a secondary neutralisation step using one or more bases selected from the group including ammonium hydroxide, limestone, lime, calcrete, magnesia, magnesite and sodium hydroxide.

In a further embodiment, the method further includes a counter current decantation step, and preferably a secondary neutralisation step. The PLS of the second neutralisation step can be utilised in subsequent extraction steps. For example, in one embodiment, there is provided a cobalt solvent extraction step including an organic extractant that selectively extracts cobalt over nickel into an organic phase to form a cobalt-rich nickel-lean extractant stream and a cobalt-lean nickel-rich raffinate. Preferably, the organic phase of the cobalt-rich nickel-lean extractant stream is converted to a cobalt-lean organic phase and the cobalt-lean organic phase is recycled as the organic phase or a component thereof.

In an alternative embodiment, either the PLS product of the secondary neutralisation step, or the cobalt-lean nickel-rich raffinate is subjected to nickel solvent extraction and direct crystallisation steps. This embodiment of the invention is described in the context of a feed solution being cobalt-lean nickel-rich raffinate, wherein the nickel solvent extraction step includes;

contacting the cobalt-lean nickel-rich raffinate with an organic phase including an organic extractant to form a nickel-rich organic phase; and the direct crystallisation step includes;

contacting the nickel-rich organic phase with an aqueous strip solution of sufficient $H_2SO_4$ concentration to extract nickel from the organic phase and of sufficient $Ni^{2+}$ concentration to precipitate $NiSO_4.6H_2O$ crystals and form a nickel-lean organic phase.

In an alternative embodiment, the method further includes a nickel solvent extraction step wherein the cobalt-lean nickel-rich raffinate is contacted with an organic phase including an organic extractant to selectively extract nickel sulphate from the aqueous solution into the organic phase to form a nickel sulphate-lean aqueous raffinate and the nickel-rich organic phase; and separating the raffinate and the nickel-rich organic phase; wherein the organic extractant is one or more branched carboxylic acids.

In an alternative embodiment, the method further includes a nickel solvent extraction step that includes contacting a cobalt-lean nickel-rich raffinate and one or more metal impurities with an organic phase, the organic phase including one or more branched carboxylic acid extractants to selectively facilitate the extraction of nickel sulphate from aqueous solution into the organic phase and form the nickel-rich organic phase.

In the above aspects and embodiments of the invention, the one or more bases are selected from the group including ammonium hydroxide, magnesia and sodium hydroxide are used in the nickel solvent extraction step; preferably ammonium hydroxide.

In forms of the above embodiment and alternative embodiments, the nickel-rich organic phase is converted to a nickel-lean organic phase and the nickel-lean organic phase is recycled as the organic phase or a component thereof.

In a fourth aspect of the invention, there is provided a method for producing nickel sulphate, the method including the steps of:

a) providing a source of nickel sulphide concentrate;
b) repulping the nickel sulphide concentrate;
c) fine grinding the nickel sulphide concentrate from step (b) to a $P_{80}$ of 10 microns;
d) low temperature pressure oxidation (LTPOX) autoclaving of the nickel sulphide concentrate from step (c) to afford a pregnant leach solution (PLS), wherein the nickel sulphide concentrate contains more than 10% nickel;
e) neutralising the PLS using one or more bases selected from the group including ammonium hydroxide, limestone, lime, calcrete, magnesia, magnesite and sodium hydroxide;
f) counter current decantation of the PLS from step (e) to separate solids from the slurry of the PLS;
g) neutralising the PLS from step (f) using one or more bases selected from the group including ammonium hydroxide, limestone, lime, calcrete, magnesia, magnesite and sodium hydroxide;
h) optionally clarifying the PLS from step (g);
i) extracting cobalt from the PLS, wherein the cobalt extraction includes an organic extractant that selectively extracts cobalt over nickel into an organic phase to form a cobalt-rich nickel-lean extractant stream and a cobalt-lean nickel-rich raffinate;
j) extracting nickel from the cobalt-lean nickel-rich raffinate; wherein the nickel extraction includes contacting the cobalt-lean nickel-rich raffinate with an organic phase including an organic extractant to form a nickel-rich organic phase; and k) direct crystallisation of the nickel-rich organic phase, wherein the direct crystallisation includes contacting the nickel-rich organic phase with an aqueous strip solution of sufficient $H_2SO_4$ concentration to extract nickel from the organic phase and of sufficient $Ni^{2+}$ concentration to precipitate $NiSO_4.6H_2O$ crystals and form a nickel-lean organic phase;

wherein the nickel sulphate is between 21 and 24% nickel and is in the form of nickel sulphate hexahydrate ($NiSO_4.6H_2O$).

As detailed in the specification below and in Example 4, the concentration of $H_2SO_4$ that is 'sufficient' to extract nickel is relative to the nickel concentration. Typically, the $H_2SO_4$ strip solution will contain 10-450 g/L $H_2SO_4$; preferably 10-300 g/L and most preferably 10-20 g/L; and 80-100 g/L of $Ni^{2+}$.

In an embodiment of the third or fourth aspects of the invention, the nickel-rich organic phase includes: 5 ppm or less Fe and/or 5 ppm or less Mn and/or 5 ppm or less Cu and/or 60 ppm or less Co and/or 10 ppm or less Zn.

In a fifth aspect of the invention there is provided a method for producing a nickel sulphate containing solution, the method including:

contacting a nickel-rich organic phase with an aqueous strip solution of sufficient $H_2SO_4$ concentration to extract nickel from the organic phase to form a nickel-lean organic phase.

In forms of any one of the first, third, fourth or fifth aspects of the invention, an ammonium sulphate by-product is recovered.

In a sixth aspect of the invention there is provided nickel sulphate produced according to the method of any one of the third, fourth or fifth aspects of the invention.

Further aspects of the present invention and further embodiments of the aspects described in the preceding paragraphs will become apparent from the following description, given by way of example and with reference to the accompanying drawings.

Definitions and Meanings of Terms of Art

As used herein, except where the context requires otherwise, the terms 'method' and 'process' and variations of the terms, are used herein interchangeably and are not used in any instance to signify a difference between the terms.

$P_{80}$ defines the product size of a slurry by the particle size at which 80% of the particles by mass are smaller than that particle size. Similarly, $P_x$ defines the product size of a slurry by the particle size at which x % of the particles by mass are smaller than that particle size.

PLS refers to a pregnant leach solution. Clarified PLS refers a pregnant leach solution where solids of the slurry have been removed, for instance, by counter current decantation. Herein, when referring to a PLS that is downstream of the removal of the suspended solids in the method of the invention, except where the context requires otherwise, reference to a PLS is equivalent to a clarified PLS.

Herein, various streams and phases of the invention are referred to as being either rich or lean in nickel and cobalt. When referring to streams and phases that form or are downstream of the cobalt solvent extraction and the nickel solvent extraction steps of the invention, a reference to a stream or phase being rich in either nickel or cobalt can be taken to mean that the stream or phase is lean in the other element, unless context requires otherwise. Similarly, when referring to streams and phases that form or are downstream of the cobalt solvent extraction and the nickel solvent extraction steps of the invention, a reference to a stream or phase being lean in either nickel or cobalt can be taken to mean that the stream or phase is rich in the other element, unless context requires otherwise.

As would be understood by the skilled person, enrichment and 'rich' in the context of this invention means that the relative concentration of the nickel or cobalt is higher than it was prior to being subjected to a previous step. For example, the PLS feedstock includes both cobalt and nickel. Application of a cobalt extraction process to a PLS feedstock generates a cobalt-lean nickel-rich raffinate, and a cobalt-rich nickel-lean extractant. The relative concentration of nickel and cobalt in the raffinate and extractant respectively is increased by at least 30%, at least 40%, at least 50%, at least 60%, at least 70%, at least 80% and at least 90% relative to the PLS feedstock. Similarly a nickel rich organic phase has a higher relative amount of nickel than the feedstock/starting material from which it was derived, being increased by at least 30%, at least 40%, at least 50%, at least 60%, at least 70%, at least 80% or at least 90% relative. The inverse is that 'lean' is understood to mean that nickel or cobalt has been depleted. Preferably at least 90%, at least 91%, at least 92%, at least 93%, at least 94%, at least 95%, at least 96%, at least 97%, at least 98% and at least 99% of the nickel or cobalt is removed to provide a lean phase. A lean phase preferably contains less than 20 ppm and more preferably less 10 ppm of nickel or cobalt.

The terms nickel sulphide concentrate and nickel/cobalt sulphide concentrate are used interchangeably herein, unless context requires otherwise.

As detailed in the specification below and in Example 4, the concentration of $H_2SO_4$ that is 'sufficient' to extract nickel is relative to the nickel concentration itself. Typically, the $H_2SO_4$ strip solution will contain 10-450 g/L $H_2SO_4$; most preferably 10-300 g/L. And sufficient $Ni^{2+}$ concentration to precipitate is 80-100 g/L.

As used herein, except where the context requires otherwise, the term "comprise" and variations of the term, such as "comprising", "comprises" and "comprised", are not intended to exclude other additives, components, integers or steps. Comprising, except where the context requires otherwise, is used interchangeably with including.

BRIEF DESCRIPTION OF THE DRAWINGS

FIG. 7: compares the quality of nickel concentrates on ground and unground samples using 175 g/t TETA (triethylenetetramine) and 175 g/t SS (sodium sulphite). Liberating pyrrhotite from pentlandite improved the rejection of pyrrhotite.

UTILITY

Figure 1:
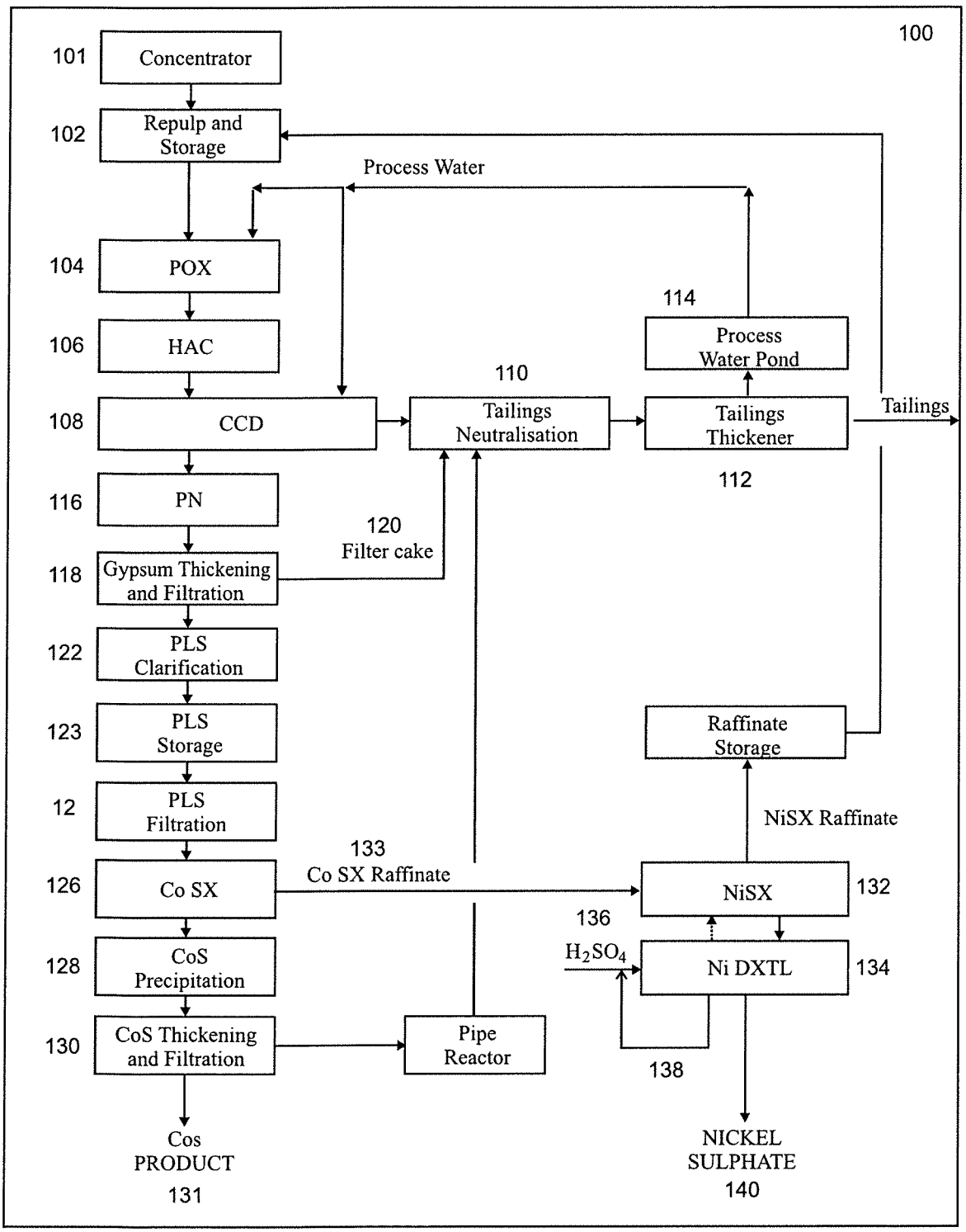
FIG. 1: Process flow diagram illustrating a high temperature pressure oxidation (HTPOX) process embodiment of the invention with the nickel recovery method according to one embodiment of the invention.

As demand for lithium-ion batteries expands in line with increasing sales of electric vehicles and energy storage systems, so too does the demand increase for high-quality battery raw materials. Nickel sulphate is critically important in certain electric vehicle battery cathodes, particularly for battery technologies using nickel-cobalt-manganese (NCM) and nickel-cobalt-aluminium (NCA) cathode chemistries. NCM and NCA technologies are becoming increasingly popular given their high energy density which, in electric vehicle applications, results in longer driving range. There is also a transition to increased proportions of nickel in the cathode for both these battery types.

Typically, nickel sulphate is produced from intermediate or refined nickel products that have been subject to multiple complex metallurgical methods. These additional methods have resulted in nickel sulphate trading at a premium to the LME nickel metal price. The quantum of the premium is largely driven by market supply and demand, quality and provenance.

The methods of the invention optimises the production of nickel sulphate directly from nickel sulphide concentrates without the requirement to first produce intermediary or refined nickel products. The nickel sulphate is in the form of hexahydrate ($NiSO_4.6H_2O$), and is high purity as defined above. This high purity nickel sulphate hexahydrate is also referred to herein as battery-grade' nickel sulphate.

In addition, the methods of the invention are more environmentally sustainable compared to the traditional production methods for nickel sulphate, due to the method's significantly lower emissions, power consumption and waste generation. In addition, the nickel sulphate recovery methods of the invention are advantageous over traditional evaporative crystallisation methods performed at ambient or near ambient conditions as the methods of the invention are significantly faster.

The methods and processes of the invention also lead to other saleable by products including an elemental sulphur by-product and a cobalt and copper containing mixed sulphide precipitate by-product.

DETAILED DESCRIPTION OF THE EMBODIMENTS

The methods of the invention combine, for the first time, several technologies (both new and known) for use in the nickel industry for the commercial integrated production of nickel sulphate. The methods of the invention can be simplified into four sequential steps, as follows:

Stage 1 Leaching: oxygen injection is used to partially oxidise the sulphide concentrate into soluble metal sulphate species (nickel, cobalt, copper, iron etc), sulphuric acid and sulphur.

Stage 2 Primary & Secondary Neutralisation: A two-stage neutralisation method for the removal of free acid, iron and other metals to achieve the required feed solution for subsequent solvent extraction.

Stage 3 Cobalt and Copper Solvent Extraction and Precipitation: Cobalt, copper, zinc, manganese and magnesium are removed from solution. The cobalt, copper and zinc are then stripped from the resulting organic solution by sulphuric acid and recovered as a Mixed Sulphide Precipitate (MSP).

Stage 4 Nickel Solvent Extraction and Crystallisation: Further impurities are removed from solution in the nickel solvent extraction circuit before crystallisation by a novel, direct crystallisation method step.

In one aspect of the invention there is a nickel solvent extraction and crystallisation method (stage 4). This method may be incorporated directly into an overall method for the recovery of cobalt and nickel from a nickel/cobalt sulphide concentrate as described in an illustrative embodiment below.

FIG. 1 is a process flow diagram of process 100 for treating a nickel/cobalt sulphide concentrate using high temperature pressure oxidation (HTPOX) technology and appropriate separation and purification steps, to which is incorporated the nickel recovering method according to an embodiment of the invention. The illustrated process includes initial comminution and flotation techniques to produce a nickel/cobalt sulphide concentrate which may be stored in concentrator 101. The concentrate may be used directly as feed to the pressure oxidation process 104 or stored. In each case the pulp density of the feed may be adjusted by repulping 102.

Once the feed is prepared, the process 100 includes subjecting the nickel/cobalt sulphide concentrate to high temperature pressure oxidation 104 before processing the oxidised nickel/cobalt sulphide concentrate in a counter current decantation process 108 to provide a nickel and cobalt pregnant leach solution and a tailing underflow.

After the pressure oxidation 104 and prior to the counter current decantation process 108, the nickel/cobalt sulphide concentrate may be treated in a hot acid cure (HAC) circuit 106 to digest basic iron sulphate (BFS) that may otherwise release iron during the tailings treatment or storage processes.

The tailings are subjected to neutralisation 110 and thickening 112 prior to disposal, process water 114 is recovered during the thickening for recycling to pressure oxidation 104. The nickel and cobalt pregnant leach solution is then subjected to a neutralisation process 116 and gypsum treatment 118. The filter cake 120 from gypsum treatment 118 is combined with the tailings from the counter current decantation process 108 and subjected to the same neutralisation 110 and thickening 112 processes. The pregnant leach solution is then subjected to clarification 122, with the clarified liquor potentially being stored 123 prior to being subjected to filtration 124 and subsequently a solvent extraction process 126 to remove cobalt. The output from the cobalt extraction process is a Co-rich Ni-lean extractant stream and a Co-lean Ni-rich raffinate. The Co-rich Ni-lean extractant stream is subjected to precipitation 128 and thickening/filtration 130 to recover cobalt as a cobalt product 131. The Co-lean Ni-rich raffinate 133 is subjected to the nickel recovery/crystallisation method of the present invention to recover a high purity nickel sulphate stream which may be subsequently processed to provide a high purity solid nickel sulphate hexahydrate.

In more detail, as shown in Example 3, the Co-lean Ni-rich raffinate 133 includes a number of impurities such as Fe, Mn, Cu, Co, and Zn. The inventors have found that this stream 133 may be subjected to a solvent extraction process 132 to selectively extract nickel from the nickel sulphate containing stream and thus provide a Ni-lean raffinate that includes substantially all of the impurities and a Ni-rich extractant stream which includes substantially no impurities. This solvent extraction process 132 makes use of an organic phase that includes an organic acid extractant. In this exemplary embodiment, the organic phase incorporates Versatic Acid 10 (a neodecanoic acid) as an extractant dissolved in a suitable diluent such as Escaid110 (a paraffin diluent that contains a mixture of $C_{12+}$ iso- and cycloalkanes). Versatic Acid 10 is a cation exchange extractant that extracts the metals from the aqueous solution through an ionic exchange process liberating an $H^+$ ion. This $H^+$ ion is returned to the Versatic Acid 10 during the stripping step using acid to strip the metal off the organic phase. Advantageously, this solvent extraction process does not involve the use of any extraneous reagents. However, the skilled addressee will appreciate that other extractants and/or diluents may be applicable. Suitable extractants include: organophosphorus acids, chelating oximes (or hydroxyoximes), carboxylic acids, and high molecular weight amines (HMWA). The diluents used are matched with the extractant selected for the specific extraction steps.

Nickel sulphate hexahydrate can then be recovered in a crystallisation process 134. Crystallisation of nickel sulphate hexahydrate 140 is achieved by stripping the loaded organic phase with a sulphuric acid strip solution 136. The concentration of the sulphuric acid used to strip the nickel from the loaded Versatic Acid 10 organic phase is not particularly important but is relative to the nickel concentration itself, as shown in Example 4. The concentration of sulphuric acid used should be high enough to drive the stripping reaction to the right (e.g. the formation of $NiSO_4.6H_2O$ in the present case) and to ensure that the solubility product value of the nickel sulphate hexahydrate 140 at the process conditions (e.g. at the operating temperature) is exceeded and maintained during the stripping step. Typically, the sulphuric acid strip solution 136 will contain 300-450 g/L $H_2SO_4$. But in an alternative embodiment, the sulphuric acid strip solution will contain 10-300 g/L $H_2SO_4$. In preferred forms, the process includes recirculating the strip solution 138 (which is depleted in sulfuric acid) but includes high $Ni^{2+}$ concentration, typically of 80-100 g/L of $Ni^{2+}$, present to ensure the solution saturation level of the nickel sulphate hexahydrate 140 is exceeded with the addition of the fresh nickel loaded organic phase from the extraction process 132. As shown in Table 10, greater that 99% of the introduced nickel content of the loaded Versatic Acid 10 phase can be stripped in a single stage. The nickel content is stripped as a more dense solid phase in the bottom of the solvent extraction mixer unit by addition of the sulphuric acid, from where it can be recovered by gravity/centrifuge and washing techniques as appropriate. Once the solid nickel sulphate hexahydrate 140 product is removed the essentially nickel-free aqueous and organic phases are separated by conventional means, where the organic phase is recycled back to the solvent extraction process 132 with the aqueous stream being returned to upstream processes as part of the overall process water balance. The amount of sulfuric acid in the strip solution is dependent on the nickel concentration of nickel in the organic extractant phase.

To ensure that the target purity of the final nickel sulphate hexahydrate 140 is achieved the loaded Versatic Acid 10 phase may be subjected to a final wash stage after extraction and scrubbing. This diluent wash stage is to minimise any metal carry-over and to minimise extractant degradation. By 'target purity' it is meant that the nickel sulphate hexahydrate is high purity/battery-grade, having at least 21% nickel, and preferably between 21 and 24% and most preferably around 22-23%, in the nickel sulphate hexahydrate. As would be understood by the skilled person this includes a nickel content of 22.0%, 22.1%, 22.2%, 22.3%, 22.4%, 22.5%, 22.6%, 22.7%, 22.8%, 22.9% and 23% in the nickel sulphate hexahydrate. It is also meant that high purity/battery-grade nickel sulphate hexahydrate is also very low in trace metal element levels, including no more than 350 ppm Co, no more than 10 ppm Cu, no more than 25 ppm Ca, no more than 15 ppm Cr, no more than 15 ppm Fe, no more than 35 ppm Mg, no more than 15 ppm Mn, no more than 15 ppm Pb and no more than 15 ppm Zn. Preferably, high purity/battery-grade nickel sulphate hexahydrate includes no more than 250 ppm Co, no more than 5 ppm Cu, no more than 15 ppm Ca, no more than 10 ppm Cr, no more than 10 ppm Fe, no more than 25 ppm Mg, no more than 10 ppm Mn, no more than 10 ppm Pb and no more than 10 ppm Zn.

The loading and stripping of the nickel in the solvent extraction process 132 and crystallisation process 134 can be carried out at or slightly above ambient temperature. By way of example, the temperature may be from ambient up to 50° C. However, no thermal energy input is generally required.

It is believed that the nickel solvent extraction and crystallisation method of the invention is the first development and implementation of such technology for making an ultra-pure (specialty chemical) product. The development of a purification and crystallisation (metal recovery) step in to a single operation has, to the best of the inventors knowledge, not been done in the metal industry, let alone the nickel industry.

The inventors have also developed a method that allows high purity nickel sulphate crystals to be prepared in an integrated method that seeks to generate a low cost and high purity nickel sulphate product, and seeks to overcome one or more shortfalls of existing methods. Importantly, the methods of the invention differ significantly from Pressure Acid Leach (PAL) and High Pressure Acid Leach (HPAL) "whole of ore" prior art methods, which are both designed to treat nickel-cobalt rich lateritic ore. Specific differences include:

Nickel sulphide concentrates typically contain 8-10% nickel and 40% iron. The direct roast of such nickel sulphide concentrates and then refining this directly to battery grade materials is not considered technically viable because of the losses of nickel that would occur with the iron residue that would have to be leached. The method of the invention in contrast is designed to treat high-grade nickel sulphide concentrate (more than 10% nickel) as opposed to a low-grade "whole of ore" laterite feed. The method of the invention is preferably designed to treat high-grade nickel sulphide concentrate containing 18%-20% nickel.

The significantly lower temperatures and pressures used in the autoclave have lower risk and capital intensity than those used in PAL and HPAL projects (See FIG. 5 and below for further explanation).

The autoclave leaching circuit uses oxygen to oxidise the sulphide minerals, which allows the metals to be selectively leached into solution. In contrast, the sulphuric acid in the PAL and HPAL projects dissolves many other gangue minerals present in the laterite ore feed.

A more viable option for going from nickel sulphide concentrate to battery grade nickel sulphate is to directly leach the concentrate either by bioleaching or pressure leaching to produce either a mixed hydroxide precipitate (MHP) or mixed sulphide precipitate (MSP) which could then be refined further. The pressure leaching of sulphide concentrates was used by Sherrit, Fort Saskatchewan to treat Lynn Lake, Manitoba, Canada nickel concentrates from 1953 and closed in 1976.

FIG. 1 illustrates one such embodiment of the nickel recovery aspect of the invention as part of a pressure oxidation method. But the application of embodiments of the invention is not limited to such a feed or combination of separation and purification steps.

Figure 3:
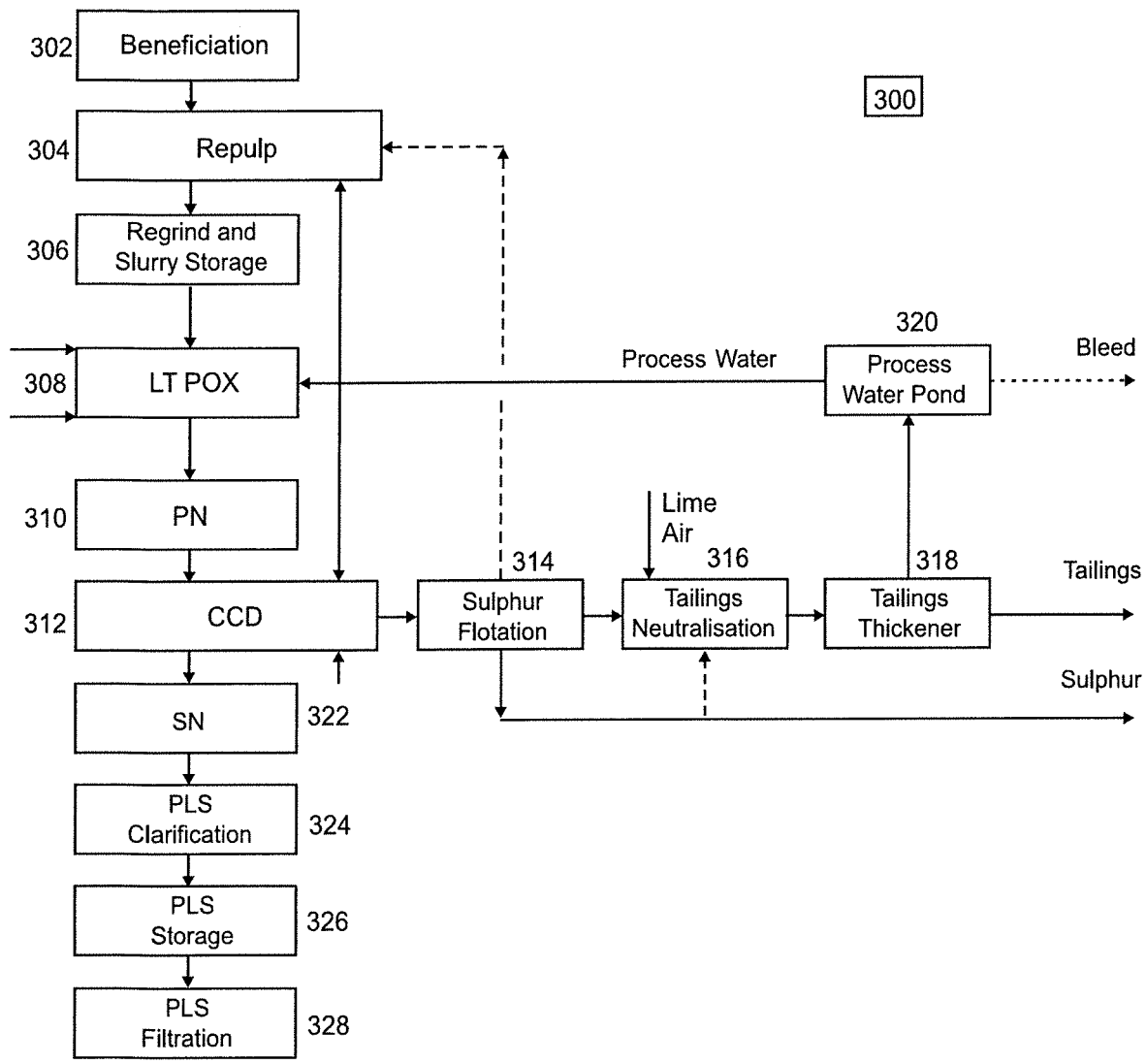
FIG. 3: Process flow diagram illustrating a low temperature pressure oxidation (LTPOX) process embodiment of the invention for producing a nickel sulphate containing solution.

By modifying the steps 102 to 124 of FIG. 1 the inventors have developed an alternative embodiment (process 300— FIG. 3) which also produces high quality and concentrated nickel sulphate containing solution that can be subjected to the crystallisation step of the invention which again, importantly, does not require the production of intermediates.

Accordingly, in one aspect of the invention there is provided a method for recovering nickel sulphate, the method including:

a low temperature pressure oxidation (LTPOX) autoclave step on a nickel sulphide concentrate, wherein the nickel sulphide concentrate contains more than 10% nickel.

This method is further explained below.

1. Beneficiation (302)

Flotation of mined nickel sulphide ore to produce a nickel sulphide concentrate; preferably the concentrate has a nickel content that is greater than 10%, preferably greater than 12% nickel and more preferably greater than 15% nickel. The extra flotation method step improves nickel grade and rejection of some iron sulphides which allows the method equipment to be smaller in size (lower volumetric throughput) which in turn allows for smaller lower capital cost refinery to be constructed while still achieving the required nickel unit throughput (see below).

2. Repulp (304)

Repulping the ground nickel sulphide concentrate with process water to achieve a slurry with a weight percentage of preferably between 10 and 20 percent solids.

3. Regrind and Slurry Storage (306)

Fine grinding of the particles of the nickel sulphide concentrate to a $P_{80}$ of 10 microns is a step that is advantageous for Low Temperature Pressure Oxidation (see Example 5). Fine grinding improves the kinetics of sulphide oxidation and the rate of nickel extraction, reducing time and energy consumption in the LTPOX step.

4. LTPOX (308)

Low Temperature Pressure Oxidation (LTPOX) of the slurry from 3 to afford a pregnant leach solution (PLS). LTPOX, as opposed to medium (approximately 150° C.-170° C.) or High (generally above 200° C.) Temperature POX (HTPOX) autoclave step (as utilised in the alternative embodiment set out in FIG. 1) allows for a discharge from the autoclave at a lower free sulphuric acid concentration (>10 g/l sulphuric acid) which results in less consumption of base and lower costs of reagents, as shown in Example 6. If limestone or lime are used, it also has the advantage of less gypsum deposition in tailings. The preferred base is ammonia (ammonium hydroxide) which results in even fewer solid tailings as no calcium is added to the circuit other than through the calcium introduced with the nickel feed source. The LTPOX autoclave step is at a temperature between 100 and 120° C. with oxygen addition to the autoclave to achieve an oxygen over pressure of approximately 800-1200 kPa, and preferably around 1000 kPa, with the concentrate having a residence time of less than 3 hours in the autoclave.

Previously LTPOX was only utilised for treating lower grade nickel concentrates. To the best of the inventors' knowledge, it has not been adapted to a method for making high grade nickel sulphate products from high-grade nickel sulphide concentrate. High grade nickel sulphide concentrate is understood by the skilled person to contain more than 10% nickel, preferably more than 12% nickel, yet more preferably 15% nickel.

Figure 5:
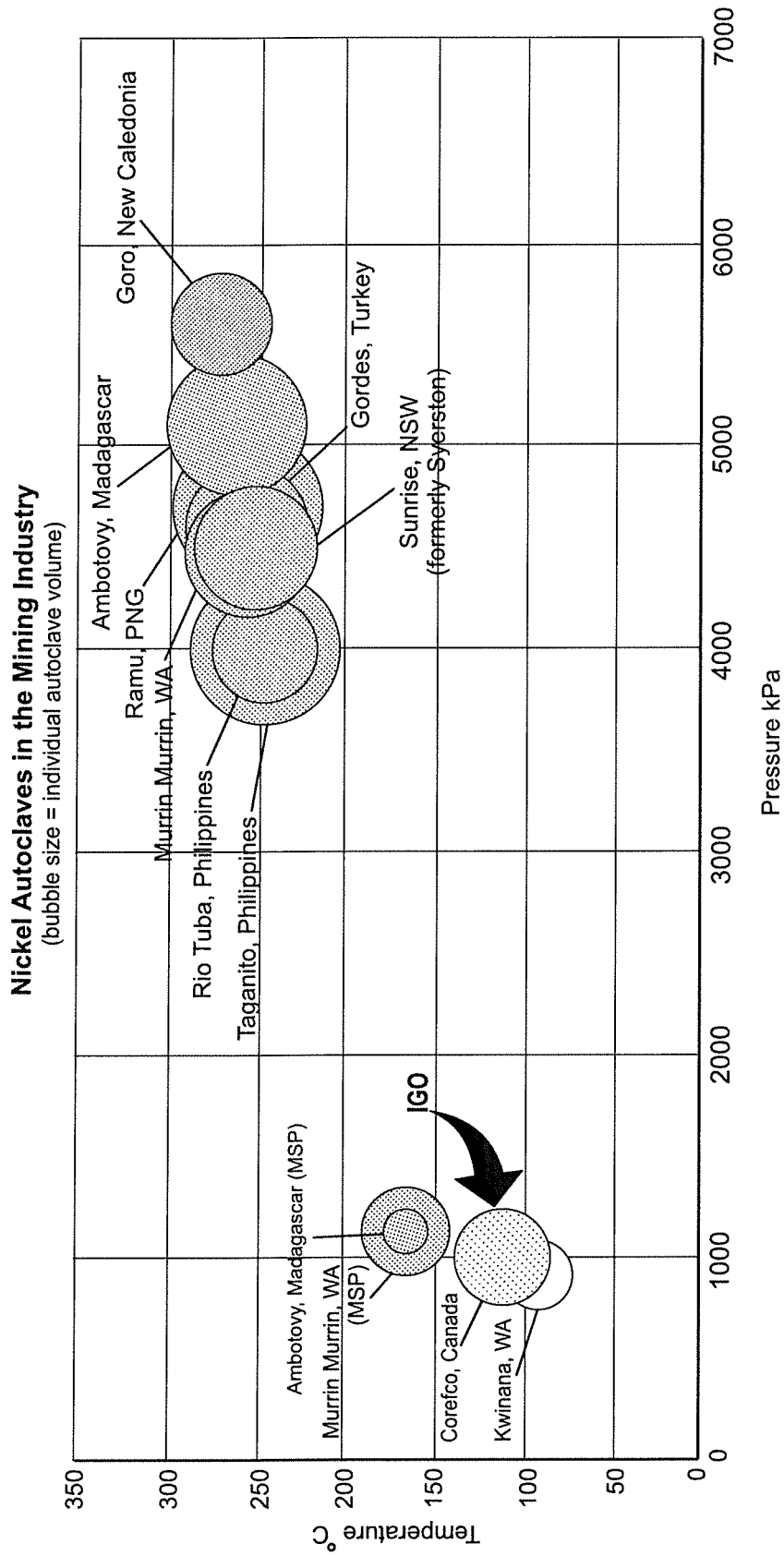
FIG. 5: The autoclave technology that has much lower temperature and pressure to leach the metal into solution compared to other methods in the nickel industry

As illustrated in FIG. 5, this autoclave technology has much lower temperature and pressure to leach the metal into solution compared to other methods in the nickel industry. The method of the invention is indicated at "IGO" in that figure. Despite having a lower temperature and pressure, the other two methods in the figure are not comparable to the claimed method. The Corefco method uses a different starting material (MSP—a mixed sulphide precipitate) and process type (ammoniacal POX leach); the Kwinana method starts with nickel matte and also relies on ammonical POX leach. The utilisation of LTPOX in the context of the method of the invention described herein for producing a nickel sulphate containing solution is believed to be unique.

At this point it should also be noted that the development of the method of the invention to include LTPOX eliminates the need for Hot Acid Cure (HAC), with the resulting advantage of better nickel recovery and less waste generation. The function of the HAC circuit is to digest BFS formed in the autoclave that might otherwise break down in tailing neutralisation or the tailings storage facility (TSF) releasing iron in solution. The HAG circuit consumes some free acid in the autoclave discharge. This is not required in LTPOX as the BFS is not thermodynamically a predominant or stable iron form in the condition used and the free acid levels are significantly lower and thus unlikely to be viable for dissolution of any solids formed.

5. PN (310)

Primary Neutralisation (PN)—any free acid generated from the oxidation of sulphides and soluble impurities such as iron and aluminium is neutralised from the PLS and precipitated as hydroxides at a pH of 3 and 90° C., as shown in Example 7. The raising of the pH can be performed by the addition of a range of neutralising agents that include, but aren't limited by, limestone, lime, calcrete, magnesia, magnesite, ammonium hydroxide, sodium hydroxide.

By eliminating the need for HAC, the PN step can be conducted prior to the Counter Current Decantation (CCD) step. This is advantageous because it minimises the risk of nickel losses.

6. CCD (312)

The slurry of the PLS is thickened, and solid liquid separation is performed in a Counter Current Decantation (CCD) method for a clarified PLS to be fed forward.

7. Sulphur Flotation (314-320)

Optional recovery is possible of a saleable elemental sulphur by-product through flotation of the thickened solids derived from the slurry of the PLS and the remained solids that are deposited in a waste storage facility after the solid wastes have been neutralized to a pH>8 with lime. Recovery of elemental sulphur is described in Example 8.

8. SN (322) and PLS Clarification, Storage and Filtration (324, 326, 328)

Secondary Neutralisation (SN)—this optional but preferred step is used to remove the remaining impurities from the Pregnant Leach Solution (PLS) at pH 4 and 70° C. using the same possible neutralising agents as detailed in step 5. This extra neutralisation step is to achieve an acceptable feed (being the product from step 328) for the following solvent extraction steps and to avoid nickel and cobalt being lost by having only a small amount of solids being precipitated and polished from the PLS.

As already noted, a PLS derived from pressure oxidation of a nickel sulphide concentrate offers significant improvements over the prior art methods. In turn the LTPOX method offers advantages over the HTPOX methods in respect of lower emissions, lower power consumption, less waste generation, higher efficiencies and elimination of the need to first produce intermediary products or refined nickel products.

For example, LTPOX is a partial oxidation method of the sulphide species in the concentrate and will oxidise a proportion of the sulphur through to the less oxidised elemental sulphur species. This is different to what occurs in the HTPOX method where all sulphide in the concentrate is oxidised to the sulphate species. All sulphate that is not associated with metal products will consume base (lime, limestone and/or other hydroxides) and these materials will be process wastes and report to the tailings and be deposited in the waste storage facility. As LTPOX converts a proportion of the sulphide to elemental sulphur (a saleable co-product) via flotation, this not only produces an extra product but lowers the tailings and reagent quantities needed for the method considerably.

HTPOX will also produce elevated sulphuric acid (Free Acid) concentrations that will consume more base and generate extra solid tailings. The lower acid levels in the LTPOX (compared with HTPOX) also ensure less gangue materials are solubilised and along with the use of high grade concentrates means that there will be far less tails for treatment and storage compared to conventional state of the art methods previously considered for nickel sulphate production.

By eliminating the pyrometallurgical roasting steps, significantly lower greenhouse gases are generated. Lower greenhouse gas emissions are advantageous due to the products from these methods ultimately destined for use in renewable or "green" energy technologies such as electric vehicles or storage of energy from solar power generation.

Additional Method Steps

Figure 4:
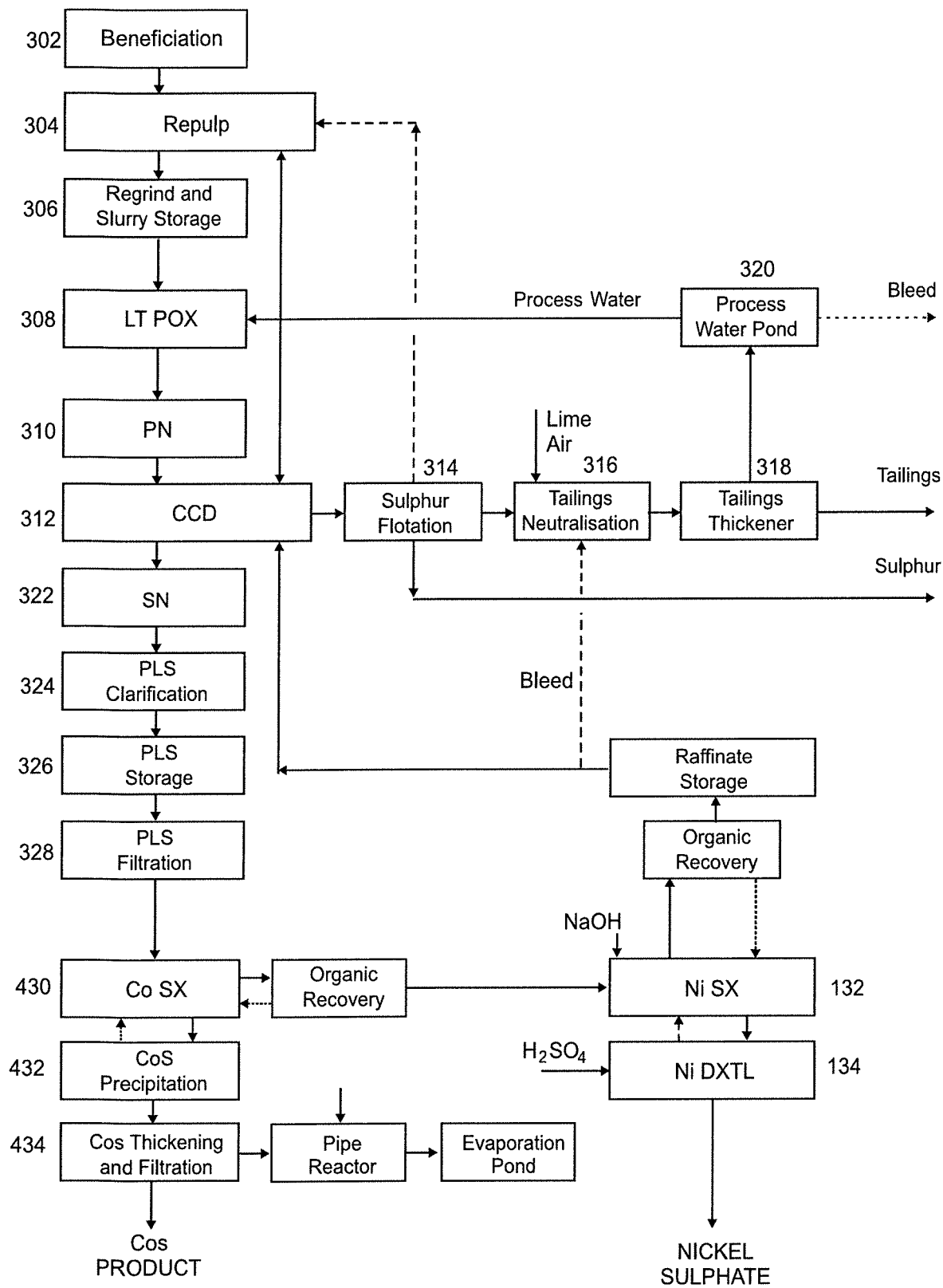
FIG. 4: Process flow diagram illustrating the low pressure oxidation process of FIG. 3 and in to which the nickel recovery method according to one embodiment of the invention is incorporated.

Subsequent to this new method, the clarified PLS is subjected to (with reference to FIGS. 1 and 4):

9. CoSX (430, 432, 434)

Cobalt Solvent Extraction (CoSX)—Co, Cu, Zn, Mn and Mg are removed from the clarified PLS in the CoSX circuit using an organophosphinic acid, such as Cyanex 272, in an organic diluent, such as VivaSol 2046, as shown in Example 9. Ammonium hydroxide or magnesia or sodium hydroxide can be used to neutralize the $H^+$ ions replaced by metals as the metals are extracted into the organic phase from aqueous. Optionally, a cobalt and copper containing mixed sulphide precipitate by-product can be recovered from the CoSX circuit.

10. NiSX (132)

Nickel Solvent Extraction (NiSX)—Ni and minor residual impurities in the clarified PLS e.g. Co, Na, Ca & Mg are removed in NiSX using Versatic 10 organic phase. Again, ammonium hydroxide or magnesia or sodium hydroxide can used as the neutralizing base. When ammonium hydroxide is used as the base for pH adjustment the method of the invention will include an ammonium sulphate crystallisation circuit.

11. NI DXTL (134)

Direct Crystallisation (DXTL)—The nickel recovery/crystallisation step is as described above as being the new method of the invention of recovering $NiSO_4.6H_2O$ crystals from a nickel rich organic phase. The new recovery/crystallisation step of the invention is shown in the context of the new method for producing a nickel sulphate containing solution in FIG. 4.

As detailed above, the loaded nickel is stripped using solubility as the parameter that crystallizes the metal sulphate hexahydrate immediately as it is stripped into the aqueous acidic nickel sulphate stripping solution with a nickel sulphate solution. In one embodiment the stripping solution contains more than 300 g/L of sulphuric acid. But in a preferred embodiment, the stripping solution contains between 10 and 300 g/L sulphuric acid. The organic can be optionally recovered for further nickel extraction in the NiSX step.

Nickel sulphate crystals are then washed, centrifuged and dried prior to packaging for commercial sale to lithium ion battery precursor material preparation by customers.

An advantage of the method of the invention for producing a nickel sulphate containing solution is that no intermediate products are produced. When starting with lateritic or previous art sulphide ore methods, intermediate product precipitation steps produce mixed hydroxide and mixed sulphide precipitates which must undergo additional refining steps. With those additional refining steps come the disadvantages of waste materials, efficiencies and nickel recovery issues already discussed above. Even for a method that starts with sulphide ore, the smelting method produces matte, which requires the most additional processing and refining to remove the iron present.

The preferred base for PN, SN, CoSX and NiSX is ammonium hydroxide. When ammonium hydroxide is used, a valuable ammonium sulphate by-product is crystallised from the circuit. This by-product is useful in the fertilizer market, and is a unique by-product of the nickel sulphide concentrate method of the invention. By that it is meant that no other integrated nickel sulphide methods, producing nickel sulphate without having an intermediate precipitation step, produce this by-product.

The method for producing a nickel sulphate containing solution of the invention also produces a high-grade cobalt and copper containing mixed sulphide precipitate co-product as per Table 1 below:

TABLE 1

Mixed Cu/Co Sulphide Precipitate (MSP) Product

| Element | Units | Average* | Range* |
|---|---|---|---|
| Cu | % | 32.8 | 31.8-33.8 |
| Co | % | 28.7 | 27.7-29.7 |
| Ni | % | 0.3 | 0.1-0.5 |
| S | % | 32.8 | 30.5-34.5 |
| Zn | ppm | 1537 | 500-3000 |
| Ag | ppm | 25 | 0-50 |
| Al | ppm | 650 | 400-900 |
| As | ppm | <15 | BDL |
| Ca | ppm | <200 | BDL |
| Cd | ppm | 35 | 15-90 |
| Fe | ppm | 240 | 50-430 |
| K | ppm | 140 | 50-270 |
| Mg | ppm | 220 | 50-480 |
| Mn | ppm | 470 | 100-600 |
| Na | ppm | 3000 | 1000-5000 |
| P | ppm | 1220 | 1100-1300 |
| Pb | ppm | 90 | 75-105 |
| Sb | ppm | 20 | 10-20 |
| V | ppm | 10 | 2-20 |
| Cr | ppm | 120 | 105-150 |
| Si | ppm | <0.2 | BDL |

BDL—below detection limit
*Dry Basis

This recovers value from any residual copper and cobalt values that enter the method from the nickel sulphide concentrate. The copper and cobalt values of the feedstock used to generate the mixed Cu/Co sulphide MSP Product tabulated above is provided in Table 5. The inclusion of step to produce a cobalt/copper product in this method is unique.

A further advantage of the method of the invention is the ability to process high arsenic content nickel concentrates (up to 5000 ppm As) through to battery grade nickel sulphate products, as described in Example 10, and for the quantitative recovery of payable PGM values after nickel and cobalt extractions from the quantitative recovery of a valuable residue stream. The method of the invention can be used process nickel concentrates including more than 100 ppm arsenic, preferably more than 1000 ppm arsenic, through to battery grade nickel sulphate products.

The methods of the invention also serve to reduce impurities:

Calcium is reduced and removed in the NiSX steps.
Copper is removed in the CoSX steps and precipitated in the Mixed Sulphide Precipitation step.
Iron is precipitated as oxides in the autoclaves and in the neutralisation steps (PN and SN); most iron is then directed to the tailings after solid-liquid separation in the CCD circuit. Some in the polishing filtration after SN.

EXAMPLES

The following examples report the results of the nickel solvent extraction and crystallisation steps, ie the nickel recovery step of the invention. Unless otherwise noted, elemental levels were measured by ICP-OES.

Example 1—Versatic Acid as an Extractant Using a Cobalt-Lean Nickel Feed Solution Table 2 shows the composition (ppm) of loaded fresh and cycled Versatic Acid 10 in 15% v/v Escaid 110 using a cobalt-lean nickel feed solution (note: bench scale testing at up to 25% v/v have also been successful). While there are very small differences in the impurity levels, the results show that the overall nickel loading capacity has not been significantly affected.

TABLE 2

Composition of Fresh and Recycled Loaded Organic Phases

| Element | Fresh Loaded Organic Phase (ppm) | Recycled Loaded Organic Phase (ppm) |
| --- | --- | --- |
| Al | <1 | <1 |
| Ca | 46 | 44 |
| Co | 4.4 | 12 |
| Cr | <0.1 | <0.1 |
| Cu | 0.46 | <0.05 |
| Fe | 10 | <1 |
| Mg | 8 | 10 |
| Mn | <0.1 | <0.1 |
| Na | 6.8 | 14.6 |
| Ni | 18,320 | 18,320 |
| Zn | 1.46 | 0.38 |

A further series of tests was carried out to confirm that stripping the nickel loaded Versatic Acid 10 with concentrated sulphuric acid did not result in degradation of the Versatic Acid 10 extractant after numerous recycle stages. Table 3 shows the nickel loading capacity before and after the Versatic Acid 10 phase in 15% v/v Escaid 110 was contacted with 430 g/L $H_2SO_4$ for 1 week.

TABLE 3

Composition of Loaded Versatic Acid 10

| Sample | Ni Loading (g/L) |
| --- | --- |
| Fresh Organic Phase | 12.84 |
| Acid Treated Organic Phase | 13.56 |

The data in Table 2 confirms that the loading capacity of the Versatic Acid 10 reagent was not affected by extended treatment with excess sulphuric acid.

Example 2—Crystallisation of the Nickel Sulphate Hexahydrate

Figure 2:
FIG. 2: Photograph showing a part of a 1.7 kg sample of $NiSO_4.6H_2O$ recovered from approximately 40 L of loaded Versatic Acid 10 extractant according to one embodiment of the invention.

The nickel solvent extraction and crystallisation of the nickel sulphate hexahydrate stages were repeated a number of times to yield the bulk sample shown in FIG. 2. FIG. 2 shows a part of a 1.7 kg sample of $NiSO_4.6H_2O$ recovered from approximately 40 L of loaded Versatic Acid 10 extractant using the Ni DXTL approach.

The average chemical composition of a number of grab samples from the bulk sample shown in FIG. 2 was analysed, with the results summarised in Table 4.

TABLE 4

Composition of crystallised nickel sulphate hexahydrate product

| Element | Unit | Value |
| --- | --- | --- |
| Ni | wt % min | 23.4 |
| Co | ppm | 53 |
| Cu | ppm | 2 |
| Fe | ppm | <1 |
| Zn | ppm | 8 |
| Mn | ppm | <1 |

TABLE 4-continued

Composition of crystallised nickel sulphate hexahydrate product

| Element | Unit | Value |
| --- | --- | --- |
| Mg | ppm | <1 |
| Pb | ppm | <1 |
| Cr | ppm | <1 |
| Ca | ppm | 7.6 |

The product whose composition is provided in Table 4 was obtained from a feedstock (Nova Concentrate) whose composition is provided in Table 5.

TABLE 5

Composition of feedstock used to generate the crystallised product of Table 4

| Element | Unit | Nova Concentrate |
| --- | --- | --- |
| Ni | % | 19.3 |
| Co | % | 0.64 |
| Fe | % | 35.2 |
| Na | ppm | 823 |
| As | ppm | 8 |
| Al | % | 0.59 |
| Cu | % | 1.17 |
| Ca | % | 0.34 |
| Mn | ppm | 255 |
| Mg | % | 0.86 |
| Zn | ppm | 82 |
| Ti | ppm | 801 |
| K | % | 0.15 |
| Sb | ppm | below detection limit |
| Si | % | 2.0 |
| S | % | 31.0 |
| S:Ni Ratio | | 1.61 |

Example 3—Selective Extraction of Nickel from a Co-Lean Ni-Rich Raffinate

Table 6 shows the results of nickel pH extraction profile sighter testing on bulk cobalt-lean nickel-rich raffinate to determine the optimum extraction pH. The testing was conducted at temperature (50° C.) at a fixed contact aqueous:organic (A:O) of 1:1 over a range of pH's (5.0, 5.5, 6.0, 6.5, and 7.0).

The results in Table 6 demonstrated that the maximum achievable nickel extraction achieved in a single batch contact with A:O ratio of 1:1, at an equilibrium pH of 7.0, was 94%. The metal extractions for Co, Ca, Mg and Cu were 81.1%, 7.58%, 1.4% and 80.8%, respectively.

Figure 6:
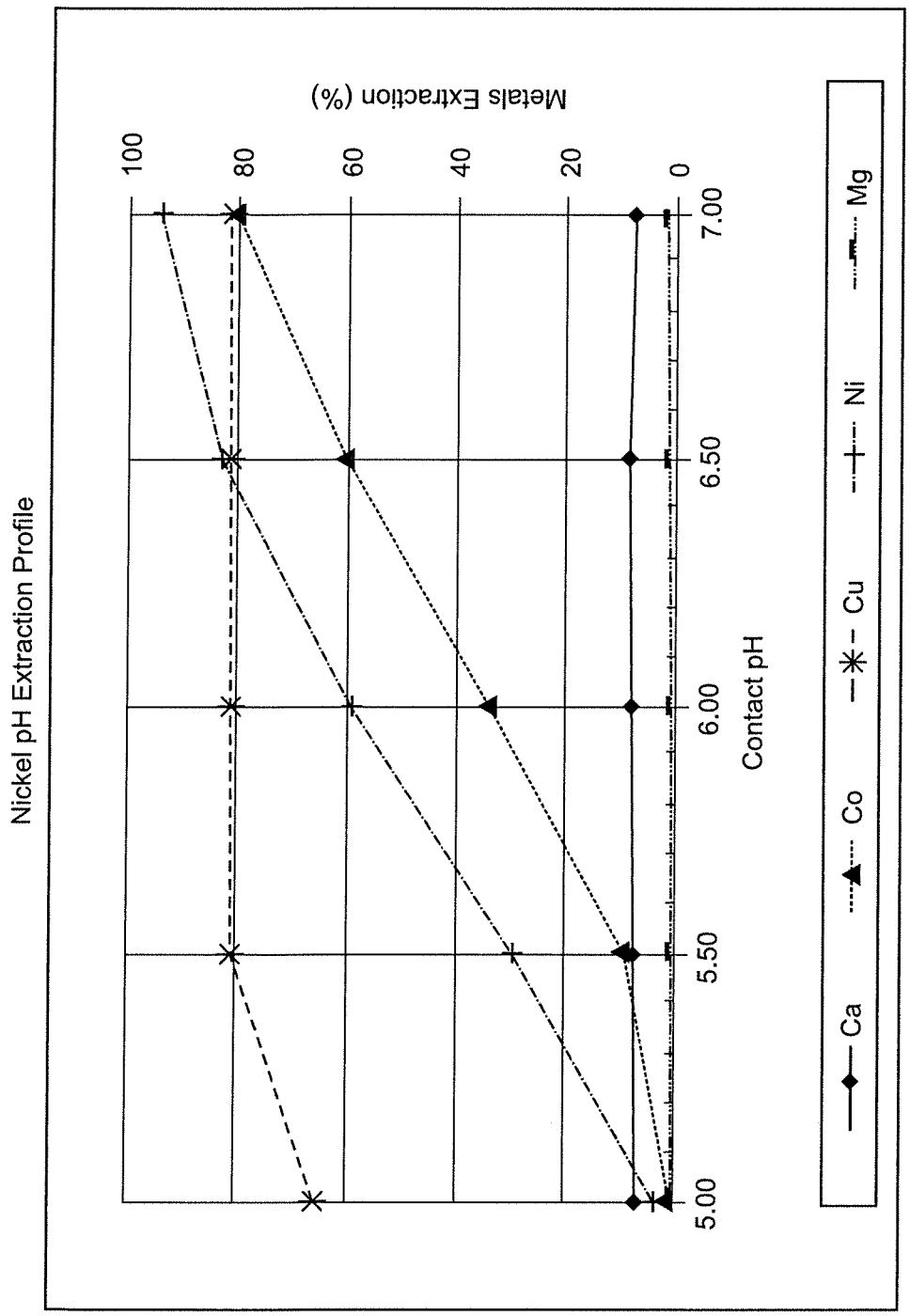
FIG. 6: A plot of the equilibrium percentage extraction of nickel and selected co-extracted metals: Co, Ca, Mg and Cu versus pH in nickel pH extraction profile sighter testing on bulk cobalt raffinate to determine the optimum extraction pH. The testing was conducted at temperature (50° C.) at a fixed contact aqueous:organic (A:O) of 1:1 over a range of pH's (5.0, 5.5, 6.0, 6.5, and 7.0).

A plot of the equilibrium percentage extraction of nickel and selected co-extracted metals: Co, Ca, Mg and Cu versus pH is provided in FIG. 6.

TABLE 6

Nickel Extraction Isotherm Sighter Test Results varying pH at 50° C., A:O 1:1
Nickel pH Extraction Isotherm Sighter Test Results

| Contact | | Metals Extraction (%) | | | | |
| --- | --- | --- | --- | --- | --- | --- |
| pH | A:O | Ni | Co | Ca | Mg | Cu |
| 5.00 | 1:1 | 3.23 | 1.23 | 6.80 | 0.27 | 65.4 |
| 5.50 | 1:1 | 29.03 | 8.85 | 7.33 | 0.32 | 80.8 |
| 6.00 | 1:1 | 58.77 | 33.91 | 8.12 | 0.57 | 80.8 |
| 6.50 | 1:1 | 83.18 | 60.20 | 8.41 | 0.92 | 80.8 |
| 6.99 | 1:1 | 94.05 | 81.08 | 7.58 | 1.44 | 80.8 |

Table 7 shows the results of nickel extraction isotherm sighter testing at a temperature of 50° C. employing varying contact ratios of aqueous:organic (A:O) on a cobalt-lean nickel-rich raffinate. Based on previous results, tests were performed targeting an equilibrium pH of 7.0.

TABLE 7

Nickel Extraction Isotherm Sighter Test Results varying A:O at 50° C., pH targeting 7

| Contact | | Extraction (%) | | | |
|---|---|---|---|---|---|
| pH | A:O | Ni | Co | Ca | Mg |
| 6.98 | 10:1 | 20.9 | 23.0 | 0.7 | 0.1 |
| 6.95 | 5:1 | 26.2 | 20.5 | 1.6 | 0.1 |
| 6.98 | 1:1 | 86.4 | 75.0 | 7.4 | 1.4 |
| 6.98 | 1:1.5 | 98.2 | 96.5 | 32.3 | 10.7 |
| 6.97 | 1:5 | 99.8 | 99.0 | 93.4 | 54.6 |
| 7.00 | 1:10 | 99.8 | 98.9 | 96.5 | 65.2 |

Table 8 shows the results of bulk nickel extraction on a bulk cobalt-lean nickel-rich raffinate. Based on the sighter results shown in Table 7, a contact A:O ratio of 1:1 targeting an equilibrium pH of 7.0 was employed. A total of three batches of nickel bulk extraction were conducted on the bulk cobalt-lean nickel-rich raffinate to generate the maximum loaded organic for feed for the strip crystallization test work. Consistent nickel extraction results were obtained across the three batches 85.8% (batch 1) to 88.4% (batch 2) with cobalt co-extraction in all three batches high, ranging from 60.7% (batch 1) to 79.7% (batch 3). However, the co-extraction of the major impurities (Ca, Mg and Na) were relatively low at <8%, <2% and <0.1% for Ca, Mg and Na respectively.

Other minor impurities (Cu, Fe and Zn) reported in the cobalt raffinate (Ni SX aqueous feed) were at trace levels (all <1 ppm).

TABLE 8

Nickel Extraction - Bulk Test Result

| Batch No. | Feed Organic | Contact | | Metal Extraction (%) | | | | |
|---|---|---|---|---|---|---|---|---|
| | | pH | A:O | Ni | Co | Ca | Mg | Na |
| 1 | Fresh | 6.98 | 1:1 | 85.8 | 60.7 | 7.7 | 1.02 | 0.04 |
| 2 | Fresh | 6.99 | 1:1 | 88.4 | 73.7 | 7.4 | 1.43 | 0.05 |
| 3 | Re-used | 6.98 | 1:1 | 87.4 | 79.7 | 7.2 | 1.15 | 0.08 |

Table 9 shows the results of nickel scrub sighter testing using the nickel-rich organic phase as the feed organic and a 10 g/L nickel solution as the scrub aqueous feed. The scrub test conducted were at an A:O ratio of 1:1 over a range of scrub target pH's (6.0, 6.50 and 7.0) using 50 g/L sulphuric acid solution as a pH modifier.

The scrub test results indicated that in a single batch contact at a scrub equilibrium pH of 6.50, greater than 75% Co, 89% Mg and 34% of Ca were scrubbed off the loaded organic. The nickel from the dilute nickel containing scrub solution was also shown to be loading on to the loaded organic (~4.8% Ni) at the scrub equilibrium pH of 6.50 as replacement to metals and species that were removed and is a key purification step in the method to make battery grade nickel sulphate.

TABLE 9

Nickel Scrubbing Test Results

| Scrub | | % Scrubbed (%) | | | | |
|---|---|---|---|---|---|---|
| A:O | pH | Ni | Co | Ca | Mg | Na |
| 1:1 | 6.00 | 13.9 | 88.7 | 28.5 | 86.1 | 78.0 |
| 1:1 | 6.50 | −4.8 | 75.2 | 34.5 | 89.9 | 78.0 |
| 1:1 | 7.00 | −23.5 | 59.6 | 26.8 | 86.1 | 75.6 |

Table 10 shows the amount of each metal that is stripped from the nickel-rich organic phase (made up of Versatic Acid 10) in each stage. The conditions used to generate Table 10 are provided in Table 11. Greater than 99% of the introduced nickel content of the loaded Versatic Acid 10 phase can be stripped in a single stage.

TABLE 10

Strip organic solution assay

| | Strip Organic Solution assay (mg/L) | | | | | | | |
|---|---|---|---|---|---|---|---|---|
| | Ni | Al | Ca | Cd | Co | Cr | Cu | Fe | K |
| Feed Organic | 20733 | 14 | 10 | 0.032 | 9.6 | <0.2 | 0.51 | <2 | <10 |
| Cycle 1 after strip | 1 | <2 | 8.2 | <0.004 | <0.1 | <0.2 | <0.1 | <2 | <10 |
| Cycle 2 | 2 | <2 | 9 | <0.004 | <0.1 | <0.2 | <0.1 | <2 | <10 |
| Cycle 3 | 2 | <2 | 13 | <0.004 | <0.1 | <0.2 | <0.1 | <2 | <10 |

| | Mg | Mn | Na | S | P | Pb | Si | Zn |
|---|---|---|---|---|---|---|---|---|
| Feed Organic | 4.1 | <0.2 | 10 | 120,592 | 22.4 | <0.04 | <10 | 0.9 |
| Cycle 1 after strip | 1.6 | <0.2 | 4.8 | 108,674 | <0.6 | <0.04 | <10 | 0.2 |
| Cycle 2 | 2 | <0.2 | 5.8 | 109,234 | <0.6 | <0.04 | <10 | 0.1 |
| Cycle 3 | 3 | <0.2 | 4.6 | 107,738 | <0.6 | <0.04 | <10 | 0.2 |

TABLE 11

Conditions used to generate Table 10

| | |
|---|---|
| Target Test Temperature (° C.): | 45 |
| Mixing Speed (rpm): | 400 |
| Contact A:O Ratio: | 1:1 |
| Numbers of Cycle: | 26 |
| Target Residual Strip Acid Concentration (g/L): | 10 |
| Contact Time (Mins): | 5 |

Example 4—Nickel Strip and Crystallization

The nickel-rich organic phase (unwashed and un-scrubbed) was subjected to a strip and crystallization in a crystallizer unit to produce nickel sulphate crystals at temperature 40° C. Each batch of the loaded organic (3 L) was stripped with 480 g/L sulphuric acid at a strip aqueous: organic (A:O) ratio of 1:1. After each successful strip the stripped organic was removed from the crystallizer and another batch of the loaded organic added to crystallizer. This was repeated over 12 contacts to concentrate up the strip aqueous to produce the nickel sulphate crystals. A summary of the test results is provided in Table 12a.

Free acid concentration is dependent upon the nickel concentration itself. Nickel sulphate crystals started to crystallize after the 7$^{th}$ cycle (7$^{th}$ contact). The concentration of nickel in the strip aqueous product began to change less significantly after the seventh contact. After the 12$^{th}$ contact, nickel sulphate crystals were harvested by vacuum filtration and washed with AR grade acetone, dried at 40° C. and submitted for analysis. The results of the crystal analysis are shown in Table 4.

TABLE 12a

Nickel Strip and Crystallization Test Results

| Cycle No. | Strip A:O Ratio | Free Acid (g/L) | Strip Solution Assay (mg/L) | | | | | | |
|---|---|---|---|---|---|---|---|---|---|
| | | | Ni | Ca | Co | Fe | Mg | Na | Zn |
| 1 | 1:1 | 488 | 18,300 | 8 | 10.2 | <1 | 9 | 5 | 1.5 |
| 2 | 1:1 | 488 | 34,946 | 16 | 18.4 | 20 | 15 | 16 | 2.9 |

TABLE 12a-continued

Nickel Strip and Crystallization Test Results

| Cycle No. | Strip A:O Ratio | Free Acid (g/L) | Strip Solution Assay (mg/L) | | | | | | |
|---|---|---|---|---|---|---|---|---|---|
| | | | Ni | Ca | Co | Fe | Mg | Na | Zn |
| 3 | 1:1 | 488 | 53,556 | 25 | 29.7 | 30 | 24 | 25 | 4.3 |
| 4 | 1:1 | 488 | 67,927 | 31 | 37 | 30 | 30 | 37 | 5.5 |
| 5 | 1:1 | 483 | 82,402 | 54 | 44.5 | 40 | 46 | 51 | 7.1 |
| 6 | 1:1 | 454 | 89,122 | 59 | 50 | 50 | 52 | 58 | 7.4 |
| 7* | 1:1 | 410 | 101,839 | 73 | 58.7 | 60 | 63 | 64 | 9 |
| 8 | 1:1 | 377 | 93,200 | 57 | 61.1 | 60 | 59 | 66 | 7.8 |
| 9 | 1:1 | 352 | 108,000 | 64 | 70.2 | 60 | 69 | 81 | 8.4 |
| 10 | 1:1 | 340 | 112,000 | 68 | 74.2 | 50 | 72 | 92 | 7.8 |
| 11 | 1:1 | 340 | 109,000 | 76 | 74.1 | 50 | 75 | 103 | 7.4 |
| 12 | 1:1 | 352 | 101,000 | 85 | 75.8 | 60 | 79 | 144 | 7.4 |

*Note nickel sulphate start to crystallize out from the strip aqueous phase

The nickel-rich organic phase was also subjected to a strip and crystallization in a crystallizer unit with a target free acid concentration of 10 g/L to produce nickel sulphate crystals. Conditions are outlined in Table 12b. Results are outlined in Table 12c.

TABLE 12b

Nickel Strip - Direct Crystallisation (DXTL) Conditions

| | |
|---|---|
| Test Target Temperature (° C.): | 45 |
| Mixing Speed (rpm): | 400 |
| Contact A:O Ratio: | 1:1 |
| Total Number of Cycles: | 26 |
| Cumulative Cycles to Produce First Batch of Crystals | 11 |
| Cumulative Cycles to Produce Second Batch of Crystals | 14 |
| Cumulative Cycles to Produce Third Batch of Crystals | 18 |
| Cumulative Cycles to Produce Fourth Batch of Crystals | 22 |
| Cumulative Cycles to Produce Fifth Batch of Crystals | 26 |
| Target Residual Strip Acid Concentration (g/L): | 10 (10-20 maintained) |
| Contact Time (Mins): | 5 |

TABLE 12c

Direct Nickel Strip and Crystallisation Test Results using the conditions outlined in Table 12b
Direct Nickel Strip and Crystallisation Test Results

| Cycle No. | Batch No. | F. Acid (g/L) | Strip A:O | Strip Organic Assay (mg/L) | | Strip Aqueous Assay (mg/L) | | Metals Strip (%) | |
|---|---|---|---|---|---|---|---|---|---|
| | | | | Ni | Co | Ni | Co | Ni | Co |
| Feed | — | 46.2 | — | 20,733 | 10 | 0 | <.05 | — | — |
| 1 | 1 | 12.5 | 1:1 | 1 | <0.1 | 20,200 | 11.1 | 100.0 | 99.0 |
| 2 | | 13.2 | 1:1 | 2 | <0.1 | 41,000 | 23.8 | 100.0 | 99.0 |
| 3 | | 21.2 | 1:1 | 2 | <0.1 | 59,500 | 34 | 100.0 | 99.0 |
| 4 | | 0.3 | 1:1 | 798 | 0 | 78,700 | 46.8 | 96.2 | 97.7 |
| 4A | | 17.5 | 1:1 | 8 | <0.1 | 79,300 | 46.6 | 100.0 | 99.0 |
| 5 | | 18.4 | 1:1 | 2 | <0.1 | 98,300 | 55.5 | 100.0 | 99.0 |
| 6 | | 18.9 | 1:1 | 2 | <0.1 | 124,000 | 63.2 | 100.0 | 99.0 |
| 7 | | 17.3 | 1:1 | 4 | <0.1 | 142,000 | 79.7 | 100.0 | 99.0 |
| 8 | | 15.7 | 1:1 | 6 | <0.1 | 157,000 | 90.1 | 100.0 | 99.0 |
| 9 | | 19.6 | 1:1 | 3 | <0.1 | 175,000 | 89 | 100.0 | 99.0 |
| 10 | | 14.0 | 1:1 | 5 | <0.1 | 123,000 | 64.4 | 100.0 | 99.0 |
| 11 | | 12.8 | 1:1 | 10 | <0.1 | 140,000 | 71.9 | 100.0 | 99.0 |
| 12 | 2 | 12.5 | 1:1 | 4 | <0.1 | 142,814 | 64 | 100.0 | 99.0 |
| 13 | | 9.3 | 1:1 | 3 | <0.1 | 143,392 | 72 | 100.0 | 99.0 |
| 14 | | 7.7 | 1:1 | 9 | <0.1 | 195,688 | 104 | 100.0 | 99.0 |

TABLE 12c-continued

Direct Nickel Strip and Crystallisation Test Results
using the conditions outlined in Table 12b
Direct Nickel Strip and Crystallisation Test Results

| Cycle No. | Batch No. | F. Acid (g/L) | Strip A:O | Strip Organic Assay (mg/L) Ni | Strip Organic Assay (mg/L) Co | Strip Aqueous Assay (mg/L) Ni | Strip Aqueous Assay (mg/L) Co | Metals Strip (%) Ni | Metals Strip (%) Co |
|---|---|---|---|---|---|---|---|---|---|
| 15 | 3 | 5.8  | 1:1 | 3  | <0.1 | 190,982 | 113 | 100.0 | 99.0 |
| 16 |   | 4.0  | 1:1 | 5  | <0.1 | 198,197 | 109 | 100.0 | 99.0 |
| 17 |   | 9.1  | 1:1 | 5  | <0.1 | 193,454 | 104 | 100.0 | 99.0 |
| 16 |   | 7.9  | 1:1 | 11 | <0.1 | 195,422 | 102 | 99.9  | 99.0 |
| 19 | 4 | 10.1 | 1:1 | 9  | <0.1 | 198,902 | 114 | 100.0 | 99.0 |
| 20 |   | 10.7 | 1:1 | 6  | <0.1 | 183,348 | 114 | 100.0 | 99.0 |
| 21 |   | 11.9 | 1:1 | 3  | <0.1 | 198,780 | 137 | 100.0 | 99.0 |
| 22 |   | 10.7 | 1:1 | 10 | <0.1 | 186,019 | 137 | 100.0 | 99.0 |
| 23 | 5 | 18.9 | 1:1 | 4  | <0.1 | 188,495 | 128 | 100.0 | 99.0 |
| 24 |   | 15.2 | 1:1 | 10 | <0.1 | 191,767 | 130 | 99.9  | 99.0 |
| 25 |   | 16.2 | 1:1 | 7  | <0.1 | 189,506 | 128 | 100.0 | 99.0 |
| 26 |   | 14.9 | 1:1 | 5  | <0.1 | 190,088 | 121 | 100.0 | 99.0 |

Example 5—Fine Grinding to Achieve High-Grade Concentrate

Fine grinding of the nickel sulphide concentrate to a $P_{80}$ of 10 microns is a step that is advantageous for Low Temperature Pressure Oxidation. Fine grinding improves the kinetics of sulphide oxidation and the rate of nickel extraction, reducing time and energy consumption in the LTPOX step.

Figure 7A:
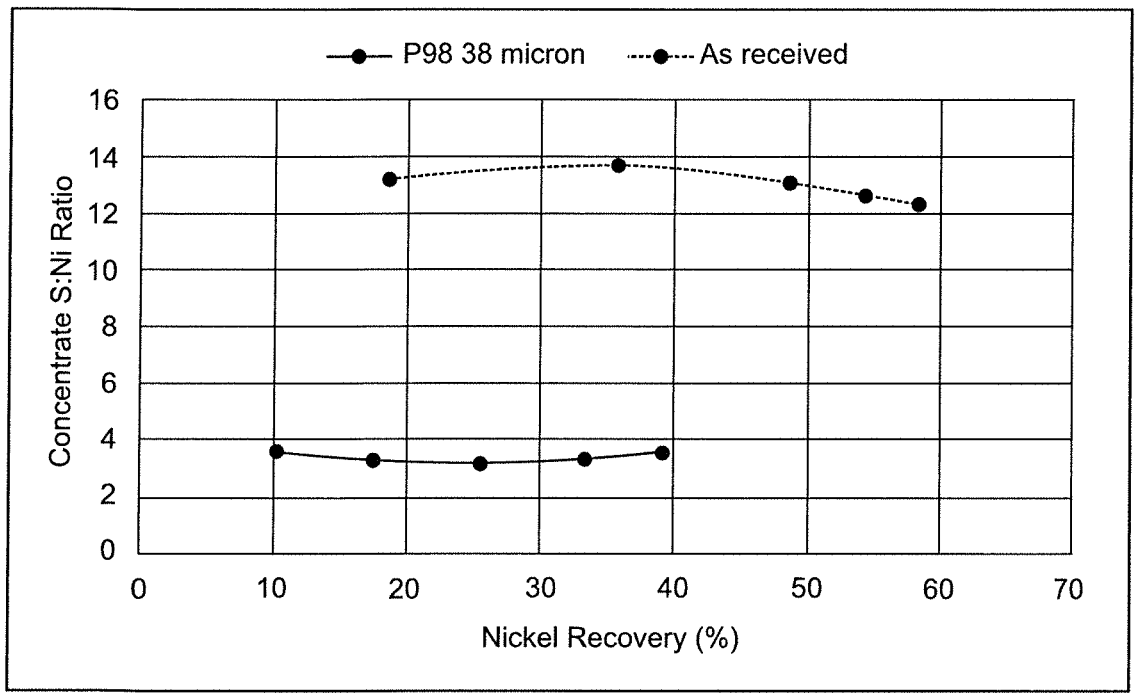
FIG. 7a compares the S:Ni ratio for ground and unground samples.
Figure 7B:
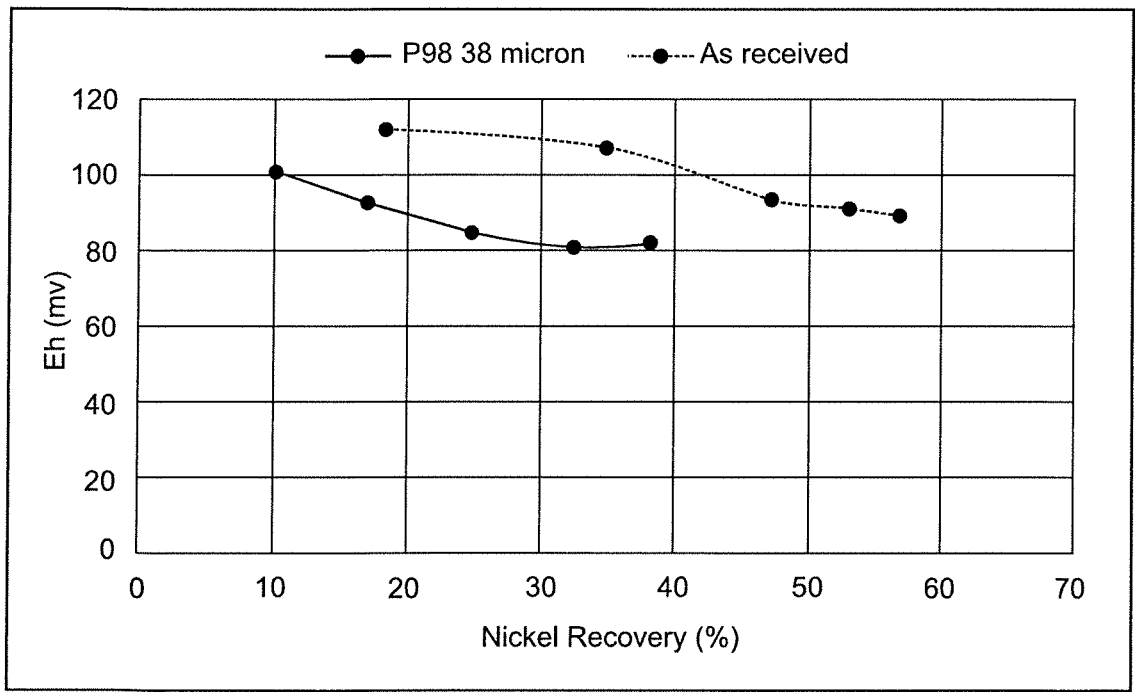
FIG. 7b compares the Eh (oxidation/reduction potential) for ground and unground samples. The activation of pyrrhotite surface by TETA and SS is supported by Eh change.

FIG. 7 compares the quality of results derived from nickel sulphide concentrates where the solids of the slurry had been ground to a $P_{80}$ of 38 microns and unground samples. 175 g/t TETA (triethylenetetramine) and 175 g/t SS (sodium sulphite) were used in both cases. Liberating pyrrhotite from pentlandite improved the rejection of pyrrhotite. FIG. 7a compares the S:Ni ratio for ground and unground samples. FIG. 7b compares the Eh (oxidation/reduction potential) for ground and unground samples. The activation of pyrrhotite surface by TETA and SS is supported by Eh change.

Figure 8A:
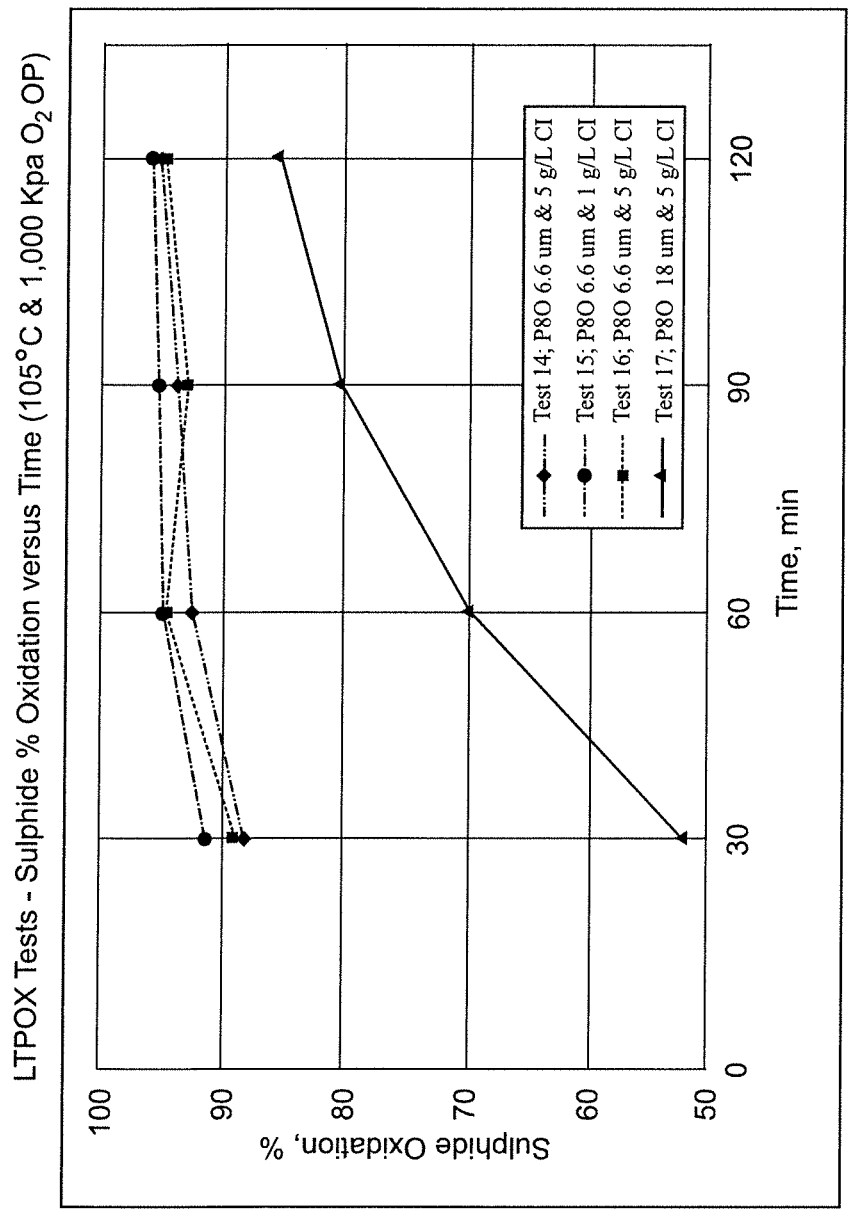
FIG. 8a: compares the kinetics of sulphide oxidation in the LTPOX step for samples with different $P_{80}$ values. Testing was conducted at 105° C. and 1,000 kPa $O_2$ OP with 1 g/L Cl or 5 g/L Cl. Samples with $P_{80}$ values of less than 10 microns were oxidised significantly faster than the sample with a $P_{80}$ value of 18 microns.

FIG. 8a compares the kinetics of sulphide oxidation in the LTPOX step for samples with different $P_{80}$ values. Testing was conducted at 105° C. and 1,000 kPa $O_2$ OP with 1 g/L Cl or 5 g/L Cl. Samples with $P_{80}$ values of less than 10 microns were oxidised significantly faster than the sample with a $P_{80}$ value of 18 microns.

Figure 8B:
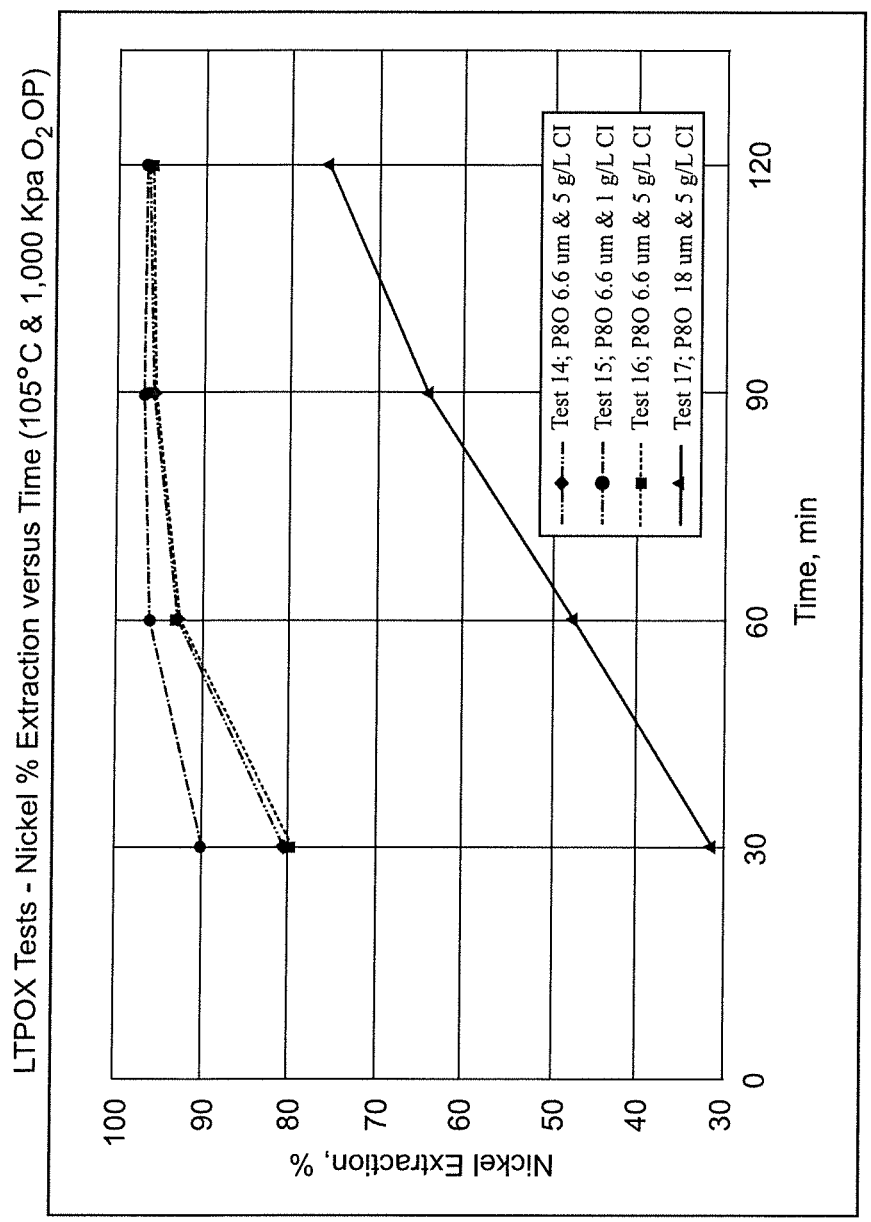
FIG. 8b: compares the rate of nickel extraction in the LTPOX step for samples with different $P_{80}$ values. Testing was conducted at 105° C. and 1,000 kPa $O_2$ OP with 1 g/L Cl or 5 g/L Cl. The nickel from samples with $P_{80}$ values of less than 10 microns was extracted significantly faster than nickel from the sample with a $P_{80}$ value of 18 microns.

FIG. 8b compares the rate of nickel extraction in the LTPOX step for samples with different $P_{80}$ values. Testing was conducted at 105° C. and 1,000 kPa $O_2$ OP with 1 g/L Cl or 5 g/L Cl. The nickel from samples with $P_{80}$ values of less than 10 microns was extracted significantly faster than nickel from the sample with a P80 value of 18 microns.

TABLE 13 summarises the key results depicted in FIG. 8 and FIG. 8b:
LTPOX Testwork - Summary of Key Results

| Test No | Feed $P_{80}$ μm | Soln Cl g/L | Time min | SOx[1] % | Extraction, % Ni | Extraction, % Co | Extraction, % Cu | Solu Analysis, mg/L Fe | Solu Analysis, mg/L Fe(II) | F/A | Final Residue % S° |
|---|---|---|---|---|---|---|---|---|---|---|---|
| 14 | 6.6 | 5.0 | 30 | 88 | 81 | 83 | 51 | 1.39 | 0.75 | 2.1 | 19.1 |
|    |     |     | 60 | 93 | 94 | 94 | 56 | 0.43 | 0.19 | 3.4 | 23.7 |
|    |     |     | 90 | 94 | 96 | 97 | 58 | 0.31 | 0.10 | 5.7 | 20.6 |
|    |     |     | 120| 95 | 97 | 97 | 58 | 0.27 | 0.06 | 6.3 | 17.8 |
| 15 | 6.6 | 1.0 | 30 | 91 | 90 | 91 | 62 | 1.76 | 1.23 | 2.9 | 18.7 |
|    |     |     | 60 | 95 | 97 | 97 | 70 | 0.89 | 0.34 | 3.8 | 19.8 |
|    |     |     | 90 | 95 | 97 | 97 | 71 | 0.85 | 0.28 | 4.2 | 21.7 |
|    |     |     | 120| 96 | 97 | 97 | 70 | 0.91 | 0.28 | 5.5 | 27.8 |
| 16 | 6.6 | 5.0 | 30 | 89 | 80 | 81 | 45 | 1.11 | 0.95 | 1.7 | 19.3 |
|    |     |     | 60 | 95 | 94 | 93 | 48 | 0.54 | 0.35 | 2.9 | 23.4 |
|    |     |     | 90 | 93 | 96 | 96 | 47 | 0.41 | 0.15 | 3.4 | 24.4 |
|    |     |     | 120| 95 | 97 | 97 | 48 | 0.36 | 0.09 | 3.4 | 19.4 |
| 17 | 18  | 5.0 | 30 | 52 | 31 | 29 | 4  | 3.84 | 0.00 | 2.1 | 15.1 |
|    |     |     | 60 | 70 | 48 | 45 | 23 | 3.29 | 0.00 | 2.6 | 18.8 |
|    |     |     | 90 | 80 | 64 | 61 | 44 | 2.05 | 0.00 | 3.4 | 21.8 |
|    |     |     | 120| 85 | 76 | 74 | 56 | 1.52 | 0.00 | 3.4 | 21.2 |

[1]SOx denotes % oxidation of sulphide sulphur

Example 6—Comparison Between LTPOX and HTPOX

Suitable conditions for both HTPOX and LTPOX of the slurry of the nickel sulphide concentrate after the regrind were assessed and compared, as summarised in Table 14 (HTPOX) and Table 15 (LTPOX).

HTPOX—High leach recoveries were demonstrated at 210° C. where the feed solids had been prepared by milling to a $P_{80}$ of 48 µm, and diluted to 20% (w/w) with solution containing 1 g/L Cl. The resultant PLS contained 62 g/L free acid, 16 g/L iron (predominately as Fe(III)), 36.4 g/L nickel, 1.08 g/L cobalt and 0.8 g/L aluminium.

The LTPOX tests demonstrated that 97% nickel and 97% cobalt and 70% copper extractions could be achieved. The partial oxidation method produced a residue which contained up to 26% $S^o$ (elemental sulphur). PLS contained 5.5 g/L free acid, 0.9 g/L iron (0.3 g/L Fe(II)), 32.9 g/L nickel, 0.98 g/L cobalt and 0.14 g/L aluminium, which is a significant advantage of this method when compared to POX leaching, which is much less selective.

POX leaching of the nickel concentrate at 210-225° C. could be considered a viable and standard process route as all of the feed sulphide is completely oxidised to sulphates. However, the high pressure of oxygen required, the rating of the pressure vessel, and the potential to generate basic ferric sulphate, should be taken into consideration. In addition, the downstream processing of the PLS will require significantly more limestone for acid neutralisation and iron removal, compared with the PLS from LTPOX and Atmospheric Leach treatments. This would result in lower costs for reagents when employing LTPOX.

TABLE 14

Summary of Comparative HTPOX Tests
Summary of Comparative POX Tests
Effect of Particle Size and Temperature (350 kPa $O_2$ Over-Pressure.)

| POX Test | Feed $P_{80}$ µm | POX Temp ° C. | Time min | SOX % | Extraction, % Ni | Co | Cu | Solution Analysis, g/L Fe | Fe(II) | F/Acid |
|---|---|---|---|---|---|---|---|---|---|---|
| Test 8 | 62 | 225 | 60 | 99 | 95 | 99 | 99 | 14.6 | 0.15 | 78.0 |
|  |  |  | 90 | 99 | 96 | 99 | 100 | 14.1 | 0.11 | 76.7 |
| Test 9 | 62 | 210 | 60 | 99 | 95 | 98 | 99 | 15.5 | 0.11 | 62.9 |
|  |  |  | 90 | 99 | 96 | 99 | 99 | 16.2 | 0.09 | 68.5 |
|  |  |  | 120 | 99 | 96 | 99 | 99 | 16.5 | 0.09 | 65.4 |
| Test 10 | 48 | 225 | 60 | 99 | 97 | 99 | 99 | 8.6 | 0.39 | 73.6 |
|  |  |  | 90 | 99 | 98 | 99 | 99 | 7.9 | 0.34 | 72.9 |
| Test 11 | 48 | 210 | 60 | 99 | 98 | 99 | 99 | 14.4 | 0.15 | 62.9 |
|  |  |  | 90 | 99 | 98 | 99 | 99 | 11.5 | 0.09 | 70.4 |
| Test 12 | 18 | 225 | 30 | 99 | 98 | 99 | 98 | 18.6 | 1.76 | 56.0 |
|  |  |  | 45 | 99 | 98 | 99 | 99 | 14.2 | 0.13 | 66.0 |
|  |  |  | 60 | 99 | 98 | 100 | 99 | 22.0 | 0.15 | 60.4 |
|  |  |  | 90 | 99 | 98 | 99 | 99 | 20.6 | 0.08 | 64.8 |

TABLE 15

Summary of Comparative LTPOX Tests
LTPOX Testwork - Summary of Key Results

| Test No | Feed $P_{80}$ µm | Soln Cl g/L | Time min | SOx [1] % | Extraction, % Ni | Co | Cu | Soln Analysis, mg/L Fe | Fe(II) | F/A | Final Residue % $S^o$ |
|---|---|---|---|---|---|---|---|---|---|---|---|
| 14 | 6.6 | 5.0 | 30 | 88 | 81 | 83 | 51 | 1.39 | 0.75 | 2.1 | 19.1 |
|  |  |  | 60 | 93 | 94 | 94 | 56 | 0.43 | 0.19 | 3.4 | 23.7 |
|  |  |  | 90 | 94 | 96 | 97 | 58 | 0.31 | 0.10 | 5.7 | 20.6 |
|  |  |  | 120 | 95 | 97 | 97 | 58 | 0.27 | 0.06 | 6.3 | 17.8 |
| 15 | 6.6 | 1.0 | 30 | 91 | 90 | 91 | 62 | 1.76 | 1.23 | 2.9 | 18.7 |
|  |  |  | 60 | 95 | 97 | 97 | 70 | 0.89 | 0.34 | 3.8 | 19.8 |
|  |  |  | 90 | 95 | 97 | 97 | 71 | 0.85 | 0.28 | 4.2 | 21.7 |
|  |  |  | 120 | 96 | 97 | 97 | 70 | 0.91 | 0.28 | 5.5 | 27.8 |
| 16 | 6.6 | 5.0 | 30 | 89 | 80 | 81 | 45 | 1.11 | 0.95 | 1.7 | 19.3 |
|  |  |  | 60 | 95 | 94 | 93 | 48 | 0.54 | 0.35 | 2.9 | 23.4 |
|  |  |  | 90 | 93 | 96 | 96 | 47 | 0.41 | 0.15 | 3.4 | 24.4 |
|  |  |  | 120 | 95 | 97 | 97 | 48 | 0.36 | 0.09 | 3.4 | 19.4 |
| 17 | 18 | 5.0 | 30 | 52 | 31 | 29 | 4 | 3.84 | 0.00 | 2.1 | 15.1 |
|  |  |  | 60 | 70 | 48 | 45 | 23 | 3.29 | 0.00 | 2.6 | 18.8 |
|  |  |  | 90 | 80 | 64 | 61 | 44 | 2.05 | 0.00 | 3.4 | 21.8 |
|  |  |  | 120 | 85 | 76 | 74 | 56 | 1.52 | 0.00 | 3.4 | 21.2 |

[1] SOx denotes % oxidation of sulphide sulphur

Example 7—Primary Neutralisation

Table 16 shows the composition of test PLSs after primary neutralisation as pH varies over time (t in minutes). Any free acid generated from the oxidation of sulphides and soluble impurities such as iron and aluminium is neutralised and precipitated as hydroxides at a pH of approximately 3.

Test Results

TABLE 6

Primary neutralisation at different pH's and times

| Solution Product | Solution g | Density kg L$^{-1}$ | pH | ORP mV | H$_2$SO$_4$ g L$^{-1}$ | Ni MG/L | Co MG/L | Fe MG/L | Na MG/L | As MG/L | Al MG/L | Cu MG/L | Ca MG/L | Mn MG/L |
|---|---|---|---|---|---|---|---|---|---|---|---|---|---|---|
| Starting solution Test Sample | 1208 | 1.141 | | | 5.7 | 21900 | 724 | 738 | 22500 | 0.31 | 38 | 931.00 | 122 | 13.2 |
| t = 0 | 26 | 1.141 | 1.81 | 460 | 5.7 | 22500 | 736 | 743 | 22900 | 0.30 | 45 | 961.00 | 130 | 13.5 |
| pH = 2.0, t = 11 | 37 | 1.144 | 2.02 | 458 | 3.5 | 22400 | 739 | 730 | 23000 | 0.31 | 43 | 945 | 926 | 13.6 |
| pH = 2.25, t = 21 | 49 | 1.144 | 2.29 | 424 | 2.3 | 22900 | 753 | 344 | 23300 | 0.36 | 38 | 971 | 995 | 13.9 |
| pH = 2.5, t = 30 | 51 | 1.142 | 2.52 | 382 | 1.5 | 22600 | 743 | 189 | 22800 | 0.34 | 35 | 954 | 822 | 13.8 |
| pH = 2.75, t = 44 | 57 | 1.142 | 2.83 | 358 | 0.8 | 22700 | 741 | 174 | 22800 | 0.26 | 26 | 958 | 1050 | 13.8 |
| pH = 3.0, t = 59 | 56 | 1.141 | 3.20 | 313 | 0.7 | 22800 | 757 | 109 | 22900 | 0.31 | 8 | 946 | 910 | 14.0 |
| pH = 3.25, t = 90 | 36 | 1.141 | 3.90 | 318 | 0.5 | 22700 | 747 | 19 | 23000 | 0.26 | BDL | 923 | 1090 | 13.9 |
| pH = 3.5, t = 115 | 35 | 1.140 | 4.83 | 297 | 0.7 | 22500 | 758 | BDL | 22900 | 0.41 | BDL | 694 | 913 | 14.1 |
| PN Final Bulk | 852 | 1.149 | 4.99 | 260 | 0.5 | 23400 | 761 | BDL | 23200 | 0.32 | BDL | 730 | 1050 | 14.2 |

(BDL denotes below detection limit)

Example 8: Recovery of Elemental Sulphur By-Product

Figure 9:
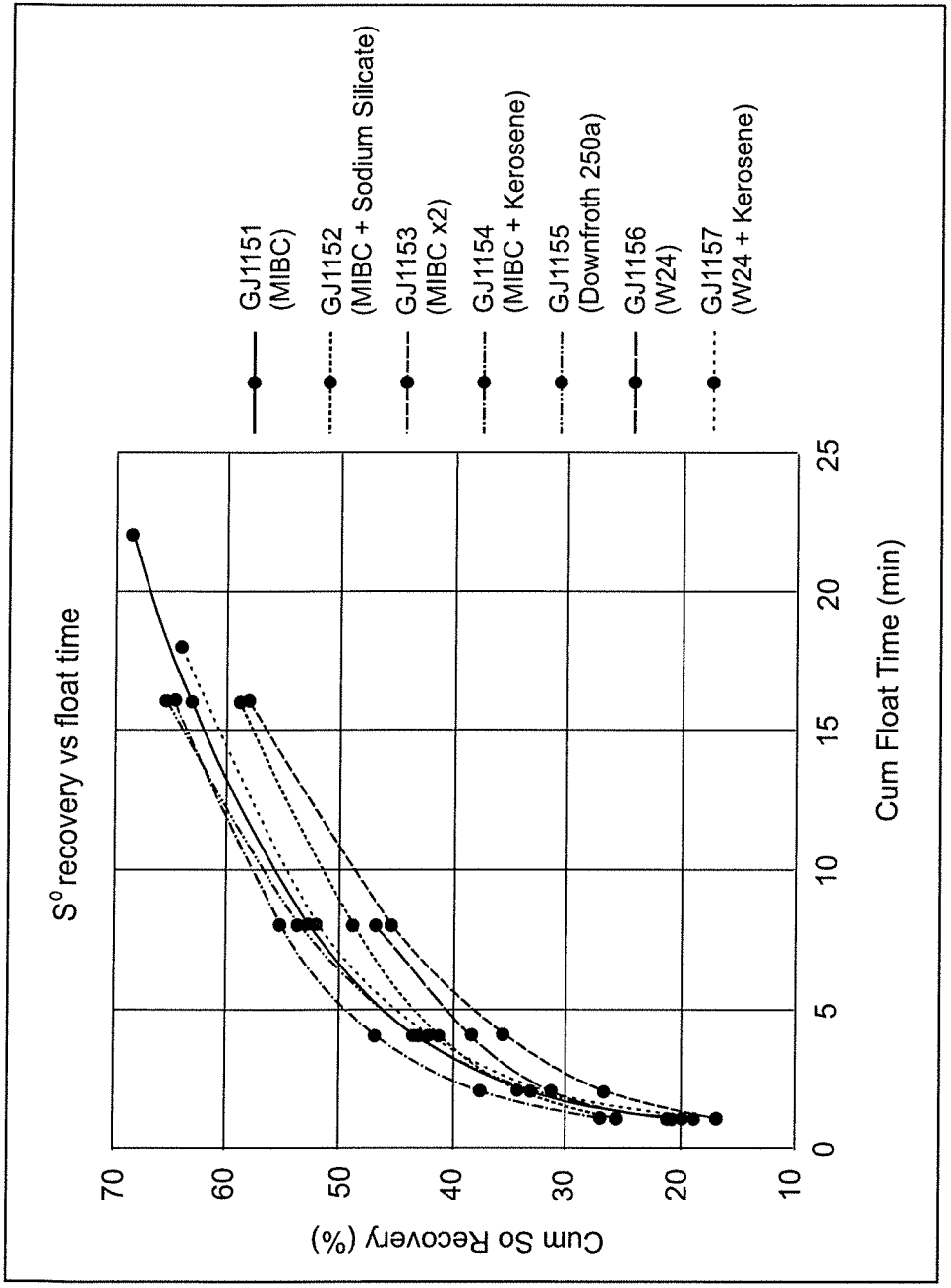
FIG. 9: shows the relationship between cumulative elemental sulphur (Cum $S_0$ Recovery (%)) and float time (Cum Float Time (min)) for different slurries of the method. These different slurries were prepared using different flotation reagents, wherein MIBC refers to methyl isobutyl carbinol, W24 refers to W24 Frother supplied by Huntsman and Dowfroth 250a refers to Dowfroth 250 A Flotation Frother supplied by Dow Chemical.

FIG. 9 shows the relationship between cumulative elemental sulphur (Cum S$^0$ Recovery (%)) and float time (Cum Float Time (min)) for different slurries of the PLS of the method. These different slurries were prepared using different flotation reagents, wherein MIBC refers to methyl isobutyl carbinol, W24 refers to W24 Frother supplied by Huntsman and Dowfroth 250a refers to Dowfroth 250 A Flotation Frother supplied by Dow Chemical.

At 20 tph with 9% S$^0$ in the feed, total elemental sulphur in the flotation feed was 14,191 tpa. It is expected that up to 60% of the elemental sulfur can be recovered to minimise this sulfur going to tailings.

Example 9: Cobalt Solvent Extraction

Table 17 shows the percentage extraction of metals from the clarified PLS in the CoSX circuit. Cobalt bulk extraction was performed at equilibrium pH of 5.70 at a contact A:O ratio of 3:1 using 10% v/v Cyanex 272 (with 5% v/v TBP). Over the two stages greater than 99% metals extraction (Co, Al, Cu and Mn) from the aqueous phase was achieved. The nickel co-extraction was relatively low (<0.6%). Scrubbing of the loaded organic at a scrub A:O ratio of 1:1 at equilibrium pH of 5.50, achieved greater than 94% Ni, 76% Mg and 32.% of Ca being scrubbed off from the loaded organic.

TABLE 17

Percentage Extraction of Metals from the Clarified PLS in the CoSX circuit

| Stage | Contact A:O | Extraction (%) (Based on Organic and Feed Aqueous assay) | | | | | | | |
|---|---|---|---|---|---|---|---|---|---|
| No. | Ratio | Al | As | Ca | Cd | Co | Cr | Cu | Fe | Mg |
| 1 | 2:1 | 33.2 | — | 2.1 | — | 85.4 | — | 96.9 | — | 15.3 |
| 2 | 2:1 | 32.9 | — | 2.3 | — | 99.8 | — | 86.3 | — | 22.9 |
| Overall | — | 99.9 | — | 4.3 | — | 99.9 | — | 98.2 | — | 33.7 |

| Stage | Contact A:O | Extraction (%) (Based on Organic and Feed Aqueous assay) | | | | | | |
|---|---|---|---|---|---|---|---|---|
| No. | Ratio | Mn | Na | Ni | P | Pb | S | Si | Zn |
| 1 | 2:1 | 93.0 | 0.02 | 0.06 | 8.7 | — | — | — | 99.4 |
| 2 | 2:1 | 94.0 | 0.01 | 0.06 | 8.2 | — | — | — | — |
| Overall | — | 99.3 | 0.03 | 0.11 | 15.0 | — | — | — | — |

Example 10: Generation of Battery Grade Nickel Products from High Arsenic Concentrates The method is able to process high arsenic content nickel concentrates (up to 5000 ppm As) through to battery grade nickel sulphate products.

Table 18 shows the composition for an alternative concentrate that is high in arsenic. Table 19 shows the crystal composition for the product generated from the high-arsenic concentrate of Table 18. The higher arsenic feed did not result in high arsenic levels in the product.

The method of the invention is robust and applicable to different concentrates as there is no system detrimental or beneficial effect on the product quality from using an alternate concentrate feed.

TABLE 18

An Alternative Nickel Concentrate Composition High in Arsenic

| Element | Unit | Alternate Concentrate |
|---|---|---|
| Ni | % | 15.0 |
| Co | % | 0.27 |
| Fe | % | 31.6 |
| Na | ppm | BDL |
| As | ppm | 3052 |
| Al | % | 0.60 |
| Cu | % | 0.71 |
| Ca | % | 0.87 |
| Mn | ppm | 777 |
| Mg | % | 1.27 |
| Zn | ppm | 90 |
| Ti | ppm | 200 |
| K | % | 0.17 |
| Sb | ppm | BDL |
| Si | % | 4.85 |
| S | % | 32.5 |
| S:Ni Ratio |  | 2.17 |

TABLE 19

Composition of the Crystals made from the High-Arsenic Concentrate of Table 18

| Element (PPM except for Ni) | Product |
|---|---|
| Ni (%) | 22.3 |
| Co | 45 |
| Cu | 3 |
| Al | 6 |
| As | 1 |
| Ca | 10 |
| Cd | 1 |
| Cr | 1 |
| Fe | 4 |
| K | 1 |
| Mg | 20 |
| Mn | 1 |
| Na | 1 |
| P | 1 |
| Pb | 1 |
| Sb | 1 |
| Si | 1 |
| Zn | 2 |

It will be understood that the invention disclosed and defined in this specification extends to all alternative combinations of two or more of the individual features mentioned or evident from the text or drawings. All of these different combinations constitute various alternative aspects of the invention.

Statements of Invention

Statement 1. A method of recovering $NiSO_4 \cdot 6H_2O$ crystals from a nickel rich organic phase, the method including:

contacting a nickel rich organic phase with an aqueous strip solution of sufficient $H_2SO_4$ concentration to extract nickel from the organic phase and of sufficient $Ni^{2+}$ concentration to precipitate $NiSO_4 \cdot 6H_2O$ crystals and form a nickel lean organic phase.

Statement 2. The method of Statement 1, further including separating the $NiSO_4 \cdot 6H_2O$ crystals from the nickel lean organic phase.

Statement 3. The method of Statement 1 or 2, wherein the strip solution has a $H_2SO_4$ concentration of 10-300 g/L Statement 4. The method of any one of the preceding Statements, wherein the nickel rich organic phase includes a coordination complex of nickel and an organic extractant, wherein the organic extractant dissociates from the nickel in the presence of a sufficient concentration of $H^+$ ions.

Statement 5. The method of Statement 4, wherein the $H^+$ ions are provided in an ion exchange process with the $NiSO_4$.

Statement 6. The method of Statement 4 or 5, wherein, the organic extractant is selected from the group consisting of: organophosphorous acids, chelating oximes or hydroxyoximes, carboxylic acids, and high molecular weight amines.

Statement 7. The method of any one of Statements 3 to 6, wherein organic extractant is from about 10 wt % up to about 25 wt % of the organic phase.

Statement 8. The method of any one of Statements 4 to 7, wherein the organic extractant is a branched carboxylic acid that has the structure:

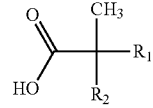

wherein $R_1$ and $R_2$ are branched or straight chain unsubstituted alkyl groups, and $R_1$ and $R_2$ together consist of from 5 to 13 carbon atoms.

Statement 9. The method of Statement 8, wherein the branched carboxylic acid is neodecanoic acid.

Statement 10. The method of any one of the preceding Statement, wherein the organic phase includes an organic diluent, and the organic diluent is one or more $C_{10+}$ alkanes.

Statement 11. The method of Statement 10, wherein organic diluent includes one or more isoalkanes, one or more cycloalkanes, and mixtures thereof.

Statement 12. The method of any one of Statements 1 to 11, wherein the method includes:

contacting an aqueous acidic nickel sulphate containing solution with an organic phase including an organic extractant to selectively extract nickel sulphate from the aqueous solution into the organic phase to form a nickel sulphate lean aqueous raffinate and the nickel rich organic phase; and separating the raffinate and the nickel rich organic phase; wherein the organic extractant is one or more branched carboxylic acids.

Statement 13. The method of any one of Statement 1 to 11, wherein the method includes:
a solvent extraction step including contacting an aqueous solution including nickel sulphate and one or more metal impurities with an organic phase, the organic phase including one or more branched carboxylic acid extractants to selectively facilitate the extraction of nickel sulphate from aqueous solution into the organic phase and form the nickel rich organic phase.

Statement 14. The method of Statement 12 or 13, wherein the nickel sulphate containing solution is a pregnant leach solution derived from the high temperature pressure oxidation of a nickel sulphide concentrate.

Statement 15. The method of Statement 12 or 13, wherein the nickel sulphate containing solution is a pregnant leach solution derived from the low temperature pressure oxidation of a nickel sulphide concentrate.

Statement 16. The method of any one of Statements 12 to 14, wherein the nickel lean organic phase is recycled as the organic phase or a component thereof.

Statement 17. The method of any one of the preceding Statements, wherein the nickel rich organic phase includes: 5 ppm or less Fe and/or 5 ppm or less Mn and/or 5 ppm or less Cu and/or 60 ppm or less Co and/or 10 ppm or less Zn.

Statement 18. The method of any one of the preceding Statements, wherein the $NiSO_4.6H_2O$ crystals include: 5 ppm or less Fe and/or 5 ppm or less Mn and/or 5 ppm or less Cu and/or 60 ppm or less Co and/or 10 ppm or less Zn.

Statement 19. The method of any one of the preceding Statements, wherein the one or more metal impurities are selected from the group consisting of: Fe, Mn, Cu, Co, Zn, and combinations thereof.

Statement 20. The method of any one of the preceding Statements, wherein the strip solution has a $Ni^{2+}$ concentration of 60 g/L or greater.

Statement 21. $NiSO_4.6H_2O$ crystals produced according to the method of any one of the preceding Statements.

Statement 22. A method for recovering nickel sulphate, the method including:
a low temperature pressure oxidation (LTPOX) autoclave step on a nickel sulphide concentrate, wherein the nickel sulphide concentrate contains more than 10% nickel.

Statement 23. The method according to Statement 22, wherein the nickel sulphide concentrate is fine ground to a $P_{80}$ of 10 microns.

Statement 24. The method of Statement 22 or 23, wherein the LTPOX autoclave step uses oxygen to oxidise the nickel sulphide of the nickel sulphide concentrate to nickel sulphate.

Statement 25. The method of any one of Statements 22-24, further including a primary neutralisation step using one or more bases selected from the group including ammonium hydroxide, limestone, lime, calcrete, magnesia, magnesite and sodium hydroxide.

Statement 26. The method of Statement 25, further including a counter current decantation step.

Statement 27. The method of Statement 26, further including a secondary neutralisation step using one or more bases selected from the group including ammonium hydroxide, limestone, lime, calcrete, magnesia, magnesite and sodium hydroxide.

Statement 28. The method of Statement 27, further including a cobalt solvent extraction step including an organic extractant that selectively extracts cobalt over nickel into an organic phase to form a cobalt-rich nickel-lean extractant stream and a cobalt-lean nickel-rich raffinate.

Statement 29. The method of Statement 28, wherein the organic phase of the cobalt-rich nickel-lean extractant stream is converted to a cobalt-lean organic phase and the cobalt-lean organic phase is recycled as the organic phase or a component thereof.

Statement 30. The method of Statement 28 or 29, further including nickel solvent extraction and direct crystallisation steps;
wherein the nickel solvent extraction step includes;
contacting the cobalt-lean nickel-rich raffinate with an organic phase including an organic extractant to form a nickel-rich organic phase; and
the direct crystallisation step includes;
contacting the nickel-rich organic phase with an aqueous strip solution of sufficient $H_2SO_4$ concentration to extract nickel from the organic phase and of sufficient $Ni^{2+}$ concentration to precipitate $NiSO_4.6H_2O$ crystals and form a nickel-lean organic phase.

Statement 31. The method of Statement 28 or 29, further including a nickel solvent extraction step wherein the cobalt-lean nickel-rich raffinate is contacted with an organic phase including an organic extractant to selectively extract nickel sulphate from the aqueous solution into the organic phase to form a nickel sulphate-lean aqueous raffinate and the nickel-rich organic phase; and
separating the raffinate and the nickel-rich organic phase;
wherein the organic extractant is one or more branched carboxylic acids.

Statement 32. The method of Statement 28 or 29, further including a nickel solvent extraction step that includes contacting a cobalt-lean nickel-rich raffinate and one or more metal impurities with an organic phase, the organic phase including one or more branched carboxylic acid extractants to selectively facilitate the extraction of nickel sulphate from aqueous solution into the organic phase and form the nickel-rich organic phase.

Statement 33. The method of any one of Statements 31-33, wherein one or more bases selected from the group including ammonium hydroxide, magnesia and sodium hydroxide are used in the nickel solvent extraction step.

Statement 34. The method of any one of Statements 31-33, wherein the nickel-rich organic phase is converted to a nickel-lean organic phase and the nickel-lean organic phase is recycled as the organic phase or a component thereof.

Statement 35. The method of any one of Statements 25-34, wherein an ammonium sulphate by-product is recovered.

Statement 36. A method for producing nickel sulphate, the method including the steps of:
a) providing a source of nickel sulphide concentrate;
b) repulping the nickel sulphide of step (a) concentrate;
c) fine grinding the nickel sulphide concentrate from step (b) to a $P_{80}$ of 10 microns;
d) low temperature pressure oxidation (LTPOX) autoclaving of the nickel sulphide concentrate from step (c) to afford a pregnant leach solution (PLS), wherein the nickel sulphide concentrate contains more than 10% nickel;
e) neutralising the PLS of step (d) using one or more bases selected from the group including ammonium hydroxide, limestone, lime, calcrete, magnesia, magnesite and sodium hydroxide;

f) counter current decantation of the PLS from step (e) to separate solids from the slurry of the PLS;

g) neutralising the PLS from step (f) using one or more bases selected from the group including ammonium hydroxide, limestone, lime, calcrete, magnesia, magnesite and sodium hydroxide;

h) optionally clarifying the PLS from step (g);

i) extracting cobalt from the PLS of step (g) or step (h), wherein the cobalt extraction includes an organic extractant that selectively extracts cobalt over nickel into an organic phase to form a cobalt-rich nickel-lean extractant stream and a cobalt-lean nickel-rich raffinate;

j) extracting nickel from the cobalt-lean nickel-rich raffinate of step (i); wherein the nickel extraction includes contacting the cobalt-lean nickel-rich raffinate with an organic phase including an organic extractant to form a nickel-rich organic phase; and k) direct crystallisation of the nickel-rich organic phase of step (j), wherein the direct crystallisation includes contacting the nickel-rich organic phase with an aqueous strip solution of sufficient $H_2SO_4$ concentration to extract nickel from the organic phase and of sufficient $Ni^{2+}$ concentration to precipitate $NiSO_4 \cdot 6H_2O$ crystals and form a nickel-lean organic phase;

wherein the nickel sulphate is between 21 and 24% nickel and is in the form of nickel sulphate hexahydrate ($NiSO_4 \cdot 6H_2O$).

Statement 37. The method of any one of Statements 30-36, wherein the nickel-rich organic phase includes: 5 ppm or less Fe and/or 5 ppm or less Mn and/or 5 ppm or less Cu and/or 60 ppm or less Co and/or 10 ppm or less Zn.

Statement 38. Nickel sulphate produced according to the method of any one of Statements 22-37.

Statement 39. The method of any one of Statements 1 to 6, wherein the method includes:

a nickel solvent extraction step including contacting an aqueous acidic nickel sulphate containing solution with an organic phase including an organic extractant to selectively extract nickel sulphate from the aqueous solution into the organic phase to form a nickel sulphate lean aqueous raffinate and the nickel rich organic phase; and separating the raffinate and the nickel rich organic phase; wherein the organic extractant is one or more branched carboxylic acids.

Statement 40. The method of any one of Statements 1 to 6, wherein the method includes:

a nickel solvent extraction step including contacting an aqueous solution including nickel sulphate and one or more metal impurities with an organic phase, the organic phase including one or more branched carboxylic acid extractants to selectively facilitate the extraction of nickel sulphate from aqueous solution into the organic phase and form the nickel rich organic phase.

Statement 41. The method of any one of Statements 1 to 6, wherein the method includes:

a nickel solvent extraction step including contacting an aqueous nickel sulphate containing solution with an organic phase including an organic extractant to form the nickel rich organic phase, wherein the aqueous nickel sulphate containing solution is a pregnant leach solution (PLS) that is a cobalt-lean nickel-rich raffinate.

Statement 42. The method of any one of Statements 39 to 41, wherein the method includes:

cobalt extraction of the nickel sulphate containing solution prior to nickel solvent extraction, wherein the cobalt extraction step includes an organic extractant that selectively extracts cobalt over nickel into an organic phase to form a cobalt-rich nickel-lean extractant stream and a cobalt-lean nickel-rich raffinate.

Statement 43. The method of any one of Statements 39 to 42, wherein the nickel sulphate containing solution is a pregnant leach solution derived from the low temperature pressure oxidation of a nickel sulphide concentrate.

Statement 44. The method of Statement 43, wherein the nickel sulphide concentrate contains more than 10% nickel.

Statement 45. The method of any one of Statements 36, 39-44, wherein the $NiSO_4 \cdot 6H_2O$ crystals include: 5 ppm or less Fe and/or 5 ppm or less Mn and/or 5 ppm or less Cu and/or 60 ppm or less Co and/or 10 ppm or less Zn.

Statement 46. The method of any one of the Statements 36, 39-45, wherein the strip solution has a $Ni^{2+}$ concentration of 60 g/L or greater.

The invention claimed is:

1. A method of recovering $NiSO_4 \cdot 6H_2O$ crystals from a nickel rich organic phase, the method including:
   contacting a nickel rich organic phase with an aqueous strip solution of sufficient $H_2SO_4$ concentration to extract nickel from the organic phase and of sufficient $Ni^{2+}$ concentration to precipitate $NiSO_4 \cdot 6H_2O$ crystals and form a nickel lean organic phase.

2. The method of claim 1, further including separating the $NiSO_4 \cdot 6H_2O$ crystals from the nickel lean organic phase.

3. The method of claim 1, wherein the strip solution has a $H_2SO_4$ concentration of 10-300 g/L.

4. The method of claim 1, wherein the nickel rich organic phase includes a coordination complex of nickel and an organic extractant, wherein the organic extractant dissociates from the nickel in the presence of a sufficient concentration of $H^+$ ions.

5. The method of claim 4, wherein the organic extractant is selected from the group consisting of: organophosphorous acids, chelating oximes or hydroxyoximes, carboxylic acids, and high molecular weight amines.

6. The method of claim 4, wherein the organic extractant is a branched carboxylic acid that has the structure:

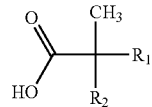

wherein $R_1$ and $R_2$ are branched or straight chain unsubstituted alkyl groups, and $R_1$ and $R_2$ together consist of from 5 to 13 carbon atoms.

7. The method of claim 1, wherein the method includes:

a nickel solvent extraction step including contacting an aqueous acidic nickel sulphate containing solution with an organic phase including an organic extractant to selectively extract nickel sulphate from the aqueous solution into the organic phase to form a nickel sulphate lean aqueous raffinate and the nickel rich organic phase; and separating the raffinate and the nickel rich organic phase; wherein the organic extractant is one or more branched carboxylic acids.

8. The method of claim 7, wherein the method includes: cobalt extraction of the nickel sulphate containing solution prior to nickel solvent extraction, wherein the cobalt extraction step includes an organic extractant that selectively extracts cobalt over nickel into an organic phase to form a cobalt-rich nickel-lean extractant stream and a cobalt-lean nickel-rich raffinate.

9. The method of claim 7, wherein the nickel sulphate containing solution is a pregnant leach solution derived from the low temperature pressure oxidation of a nickel sulphide concentrate.

10. The method of claim 7, wherein the nickel sulphate containing solution is a pregnant leach solution derived from the low temperature pressure oxidation of nickel sulphide concentrate, the sulphide concentrate containing more than 10% nickel.

11. The method of claim 1, wherein the method includes:
a nickel solvent extraction step including contacting an aqueous solution including nickel sulphate and one or more metal impurities with an organic phase, the organic phase including one or more branched carboxylic acid extractants to selectively facilitate the extraction of nickel sulphate from aqueous solution into the organic phase and form the nickel rich organic phase.

12. The method of claim 1, wherein the method includes:
a nickel solvent extraction step including contacting an aqueous nickel sulphate containing solution with an organic phase including an organic extractant to form the nickel rich organic phase, wherein the aqueous nickel sulphate containing solution is a pregnant leach solution (PLS) that is a cobalt-lean nickel-rich raffinate.

13. The method of claim 1, wherein the $NiSO_4.6H_2O$ crystals include: 5 ppm or less Fe and/or 5 ppm or less Mn and/or 5 ppm or less Cu and/or 60 ppm or less Co and/or 10 ppm or less Zn.

14. The method of claim 1, wherein the strip solution has a $Ni^{2+}$ concentration of 60 g/L or greater.

15. A method for producing nickel sulphate, the method including the steps of:
a) providing a source of nickel sulphide concentrate;
b) repulping the nickel sulphide of step (a) concentrate;
c) fine grinding the nickel sulphide concentrate from step (b) to a $P_{80}$ of 10 microns;
d) low temperature pressure oxidation (LTPOX) autoclaving of the nickel sulphide concentrate from step (c) to afford a pregnant leach solution (PLS), wherein the nickel sulphide concentrate contains more than 10% nickel;
e) neutralising the PLS of step (d) using one or more bases selected from the group including ammonium hydroxide, limestone, lime, calcrete, magnesia, magnesite and sodium hydroxide;
f) counter current decantation of the PLS from step (e) to separate solids from the slurry of the PLS;
g) neutralising the PLS from step (f) using one or more bases selected from the group including ammonium hydroxide, limestone, lime, calcrete, magnesia, magnesite and sodium hydroxide;
h) optionally clarifying the PLS from step (g);
i) extracting cobalt from the PLS of step (g) or step (h), wherein the cobalt extraction includes an organic extractant that selectively extracts cobalt over nickel into an organic phase to form a cobalt-rich nickel-lean extractant stream and a cobalt-lean nickel-rich raffinate;
j) extracting nickel from the cobalt-lean nickel-rich raffinate of step (i); wherein the nickel extraction includes contacting the cobalt-lean nickel-rich raffinate with an organic phase including an organic extractant to form a nickel-rich organic phase; and
k) direct crystallisation of the nickel-rich organic phase of step (j), wherein the direct crystallisation includes contacting the nickel-rich organic phase with an aqueous strip solution of sufficient $H_2SO_4$ concentration to extract nickel from the organic phase and of sufficient $Ni^{2+}$ concentration to precipitate $NiSO_4.6H_2O$ crystals and form a nickel-lean organic phase;
wherein the nickel sulphate is between 21 and 24% nickel and is in the form of nickel sulphate hexahydrate ($NiSO_4.6H_2O$).

* * * * *